United States Patent [19]
Blumberg

[11] Patent Number: 4,734,005
[45] Date of Patent: Mar. 29, 1988

[54] VENDING MACHINE FOR VIDEO CASSETTES

[76] Inventor: Marvin Blumberg, 7105 Broxburn Dr., Bethesda, Md. 20817

[21] Appl. No.: 927,585
[22] Filed: Nov. 6, 1986

Related U.S. Application Data

[63] Continuation-in-part of Ser. No. 756,955, Jul. 19, 1985, Pat. No. 4,668,150.

[51] Int. Cl.$^4$ ............................................... B65G 1/06
[52] U.S. Cl. ...................................... 414/273; 221/88; 221/195; 414/280; 414/661
[58] Field of Search .............. 414/268, 269, 273, 276, 414/277, 331, 280–283, 659–663, 417; 221/87–89, 129, 132, 195; 198/346.2, 468.1, 740

[56] References Cited

U.S. PATENT DOCUMENTS

| | | | |
|---|---|---|---|
| 2,840,265 | 6/1958 | Noyes | 221/129 X |
| 3,049,247 | 8/1962 | Lemelson | 414/273 |
| 3,219,207 | 11/1965 | Chasar | 414/281 X |
| 3,269,595 | 8/1966 | Krakauer et al. | 221/195 X |
| 3,297,379 | 1/1967 | Artaud et al. | 414/273 X |
| 3,302,804 | 2/1967 | Harris | 414/283 |
| 3,402,836 | 9/1968 | Debrey et al. | 414/282 X |
| 3,473,675 | 10/1969 | Goldammer et al. | 414/273 |
| 3,810,730 | 5/1974 | Carlsson | 414/280 X |
| 3,938,190 | 2/1976 | Semmlow et al. | 360/92 |
| 3,964,577 | 6/1976 | Bengtsson | 414/280 X |
| 4,003,296 | 1/1977 | Wentz | 414/269 X |
| 4,145,724 | 3/1979 | Medding et al. | 360/92 |
| 4,251,177 | 2/1981 | Neuhaeusser et al. | 414/276 |
| 4,359,631 | 11/1982 | Lockwood et al. | 235/381 |
| 4,415,975 | 11/1983 | Burt | 414/273 X |
| 4,450,978 | 5/1984 | Graef et al. | 221/195 X |
| 4,519,522 | 5/1985 | McElwee | 414/273 X |
| 4,546,901 | 10/1985 | Buttarazzi | 414/280 X |
| 4,668,150 | 5/1987 | Blumberg | 414/273 |
| 4,690,283 | 9/1987 | Carrell | 414/276 X |

FOREIGN PATENT DOCUMENTS

| | | | |
|---|---|---|---|
| 156107 | 12/1980 | Japan | 414/280 |
| 118602 | 7/1984 | Japan | 414/280 |
| 2101574 | 1/1983 | United Kingdom | 414/273 |

OTHER PUBLICATIONS

The Cybernetic Micro Systems leaflet on the CY512 Intelligence Positioning Stepper Motor Controller, 1981.
The Cybernetic Micro Systems leaflet on the CY232 Parallel/Serial Interface and Network Controller, 1983.
The Clifton Precision, Litton Systems, Inc. Brochure.

*Primary Examiner*—Joseph E. Valenza
*Assistant Examiner*—David A. Bucci
*Attorney, Agent, or Firm*—Spencer & Frank

[57] ABSTRACT

A machine for automatically dispensing a selected container from a store of containers and for automatically storing a container returned to the machine. The machine includes an array of storage bins arranged in a plurality of vertically-stacked, horizontal rows, with a horizontal passage between adjacent ones of the horizontal rows and a vertical passage connecting the horizontal passages, and each container being stored in a respective one of the bins. A carriage is mounted for movement relative to the bins for transporting a container between a first machine position for dispensing a selected container and for receiving a returned container, and a second position corresponding to one of the bins. A controllable arm is mounted to the carriage for movement therewith between the first and second machine positions and for movement relative to the carriage along a horizontal path transverse to the horizontal passages, the controllable arm presenting first and second vertical surfaces. A control device is responsive to an input signal which corresponds to one of the bins for moving the carriage between the first and second positions and for moving the controllable arm along the horizontal path at the second position for one of removing a selected container from, or inserting a returned container into the one bin, the first vertical surface of the controllable arm being disposed for pushing a selected container out of its associated bin and into the carriage, and the second vertical surface being disposed for pushing a returned container from the carriage into the one bin.

12 Claims, 26 Drawing Figures

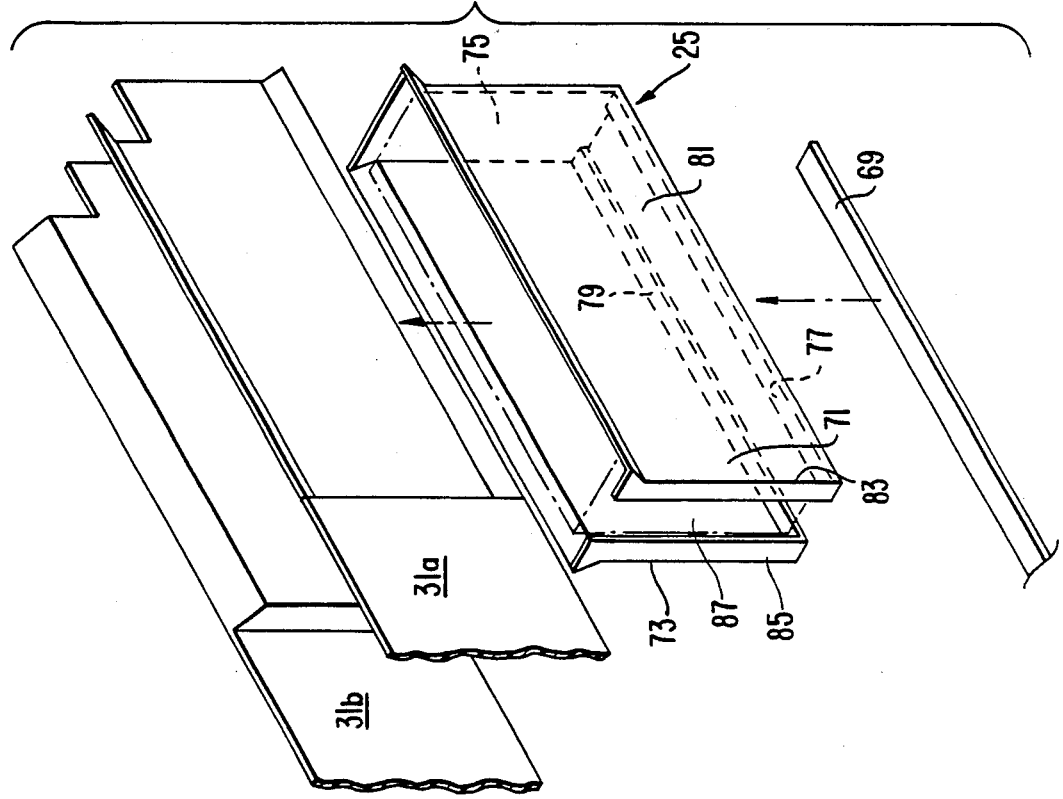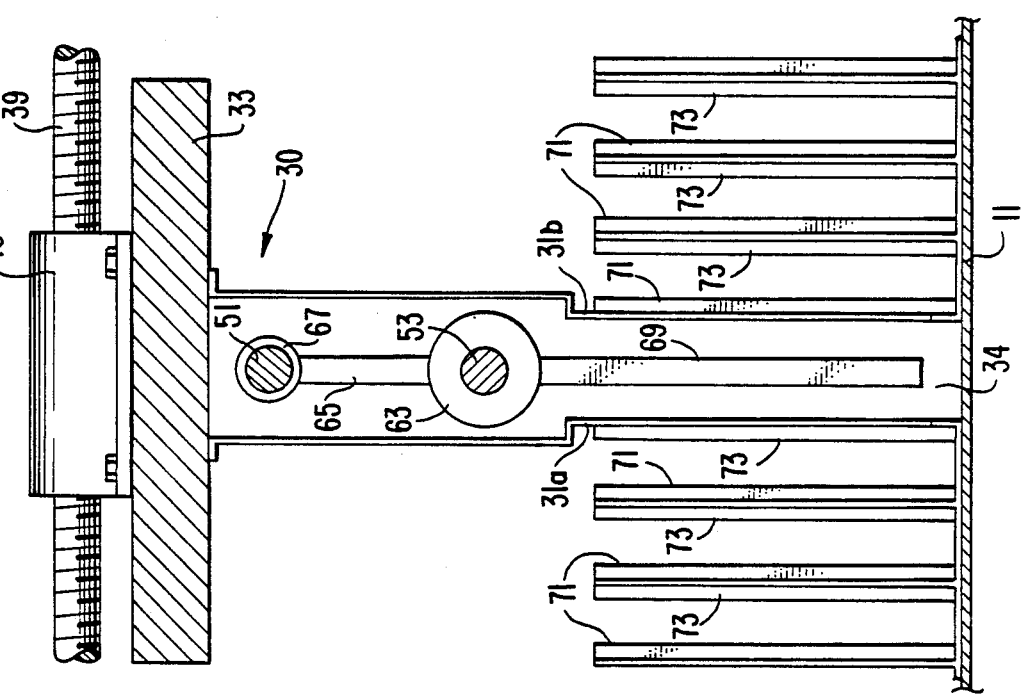

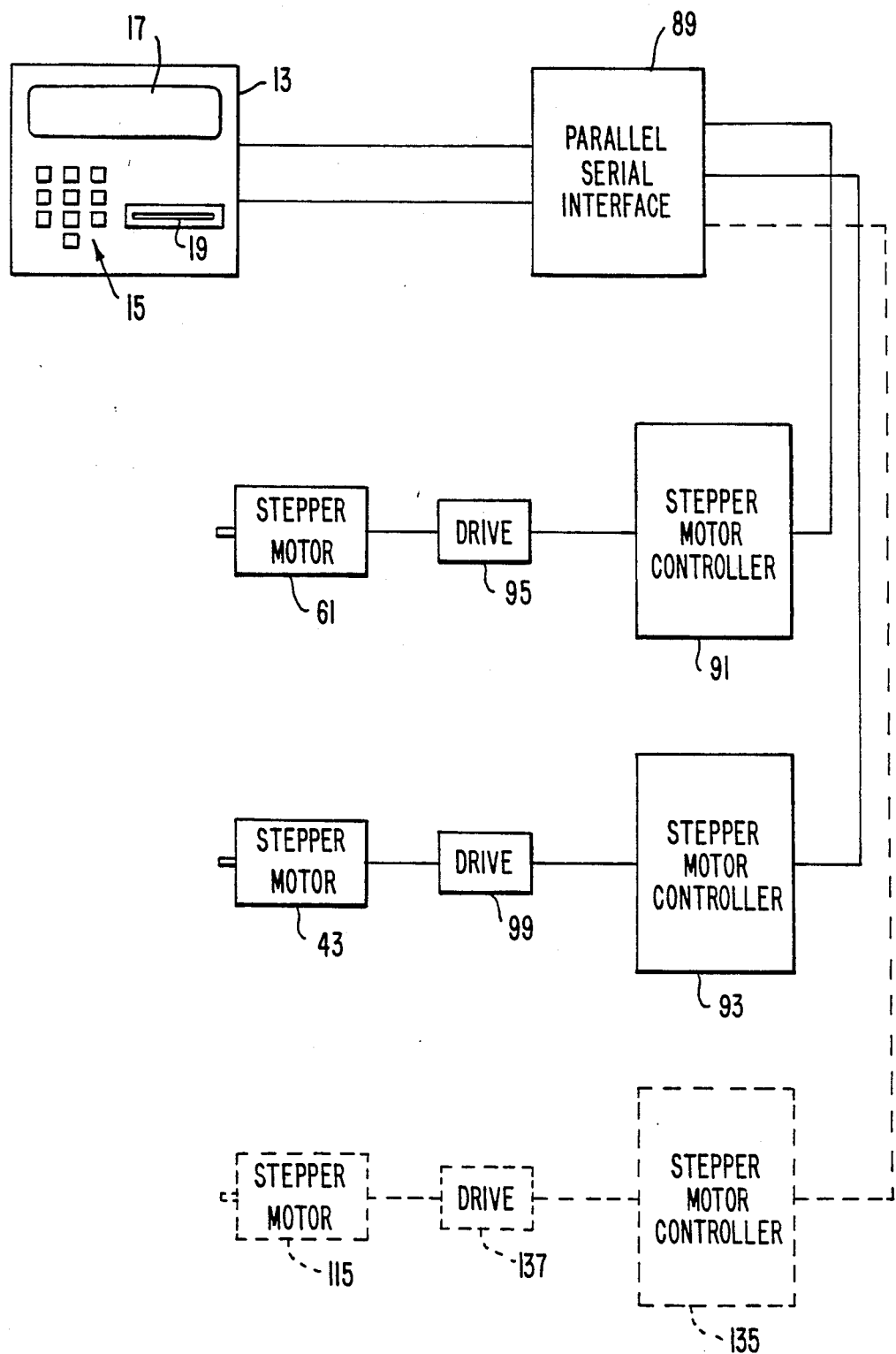

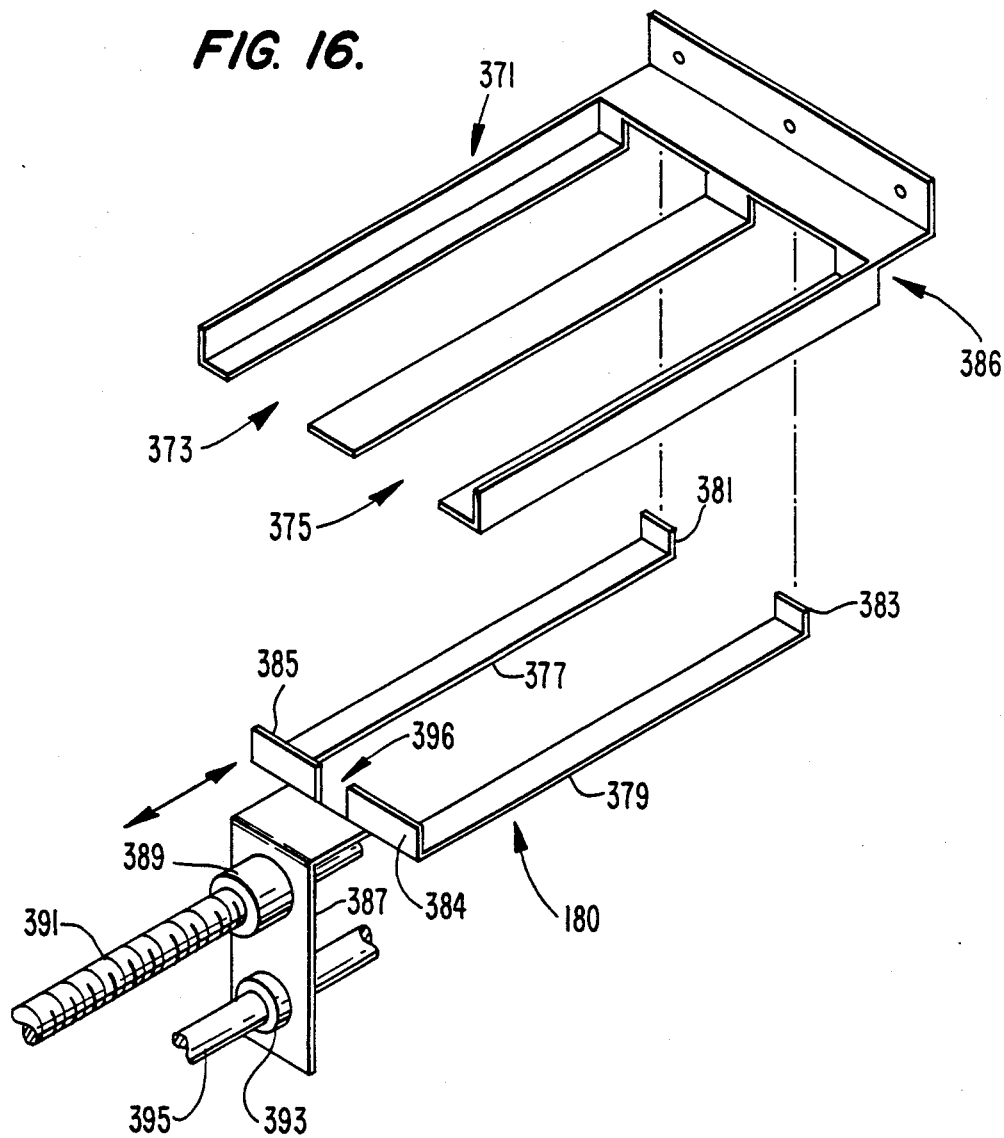

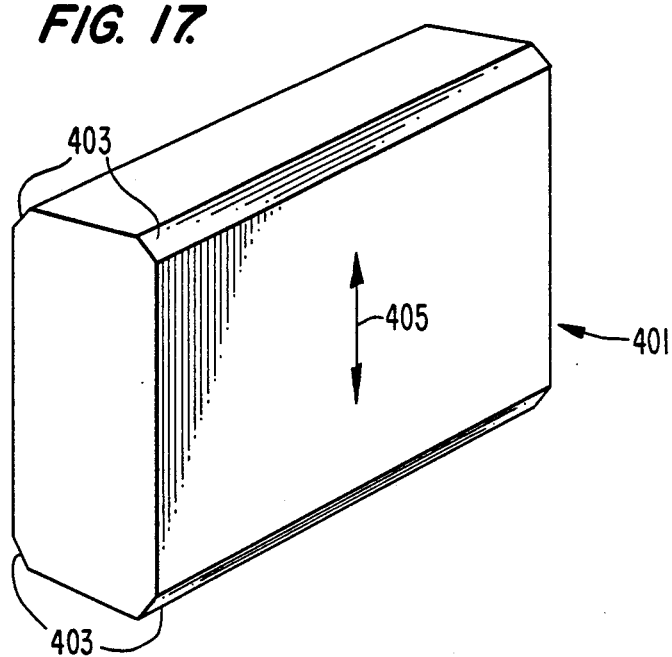
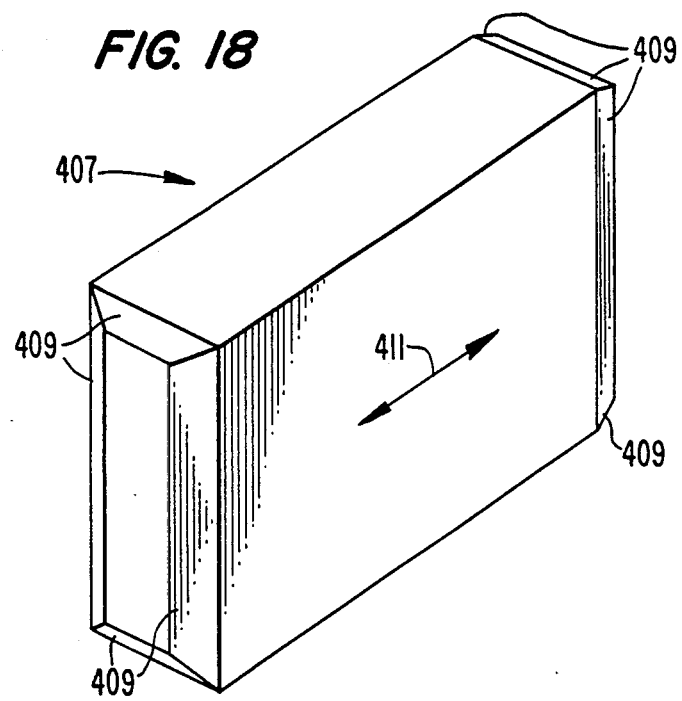

VENDING MACHINE FOR VIDEO CASSETTES

BACKGROUND OF THE INVENTION

This invention relates to a machine for automatically retrieving and dispensing a selected container from a store of containers and for receiving and storing a container which is returned to the machine. The invention is particularly useful as a vending machine for video cassettes and the like which are dispensed for the temporary usage of a person and which must be returned and stored in the machine for subsequent dispensing.

In the recent years the increased usage of video cassette recorders (VCR's) to play prerecorded programming, primarily in the form of popular movies, has resulted in a large rental market for such video cassettes. The distribution chain for video cassette rentals has primarily been through a plethora of video cassette rental stores which have opened all over the country to meet this demand. A typical transaction involves going into one of such video cassette rental stores, engaging a sales person to orally request a selected movie, often after waiting in a long line, and if the selected video cassette is in stock completing a rental transaction. Upon returning the rented video cassette to the store often times it is again necessary to engage a sales person, possibly after waiting in another line, to settle the rental account. In short, the principal mechanism which has developed in the market place for the rental of video cassettes is often time consuming and inconvenient.

Because of its relatively small size, the standard video cassette is capable of being disposed by a vending machine. In fact, applicant is aware of one such vending machine which has been developed for this purpose. This known video cassette vending machine is basically a cigarette-type vending machine which has been modified to accommodate video cassettes. This machine contains a limited store of cassette movie titles which are selected and dispensed in a manner similar to the selection and dispensing of a package of cigarettes. That is, the machine dispenses the selected video cassette by dropping the cassette from a column of like titles to a platform located below the column where the person making the selection can remove the cassette from the machine. After completing the use of the cassette, the customer returns the cassette by depositing it in a storage bin associated with the machine. In order to position the cassette for subsequent dispensing, an operator must physically open the machine and place the cassettes contained in the storage bin in a respective one of the columns associated with the various movie titles.

The above described cassette vending machine has several disadvantages. As noted above, the design of the machine permits it to dispense only a limited number of titles. Second, the cassettes are subject to being damaged in the dispensing process when they are dropped to the platform and again when they are returned to the machine and dropped into the storage bin. Further, the machine requires constant oversight by an operator in order to store the returned cassettes in the appropriate position so that they can be later dispensed.

SUMMARY OF THE INVENTION

It is an object of the invention to provide a machine for automatically dispensing a selected container from a store of containers and for automatically receiving and storing a container which is returned to the machine.

It is a more particular object of the invention to provide a video cassette vending machine which can store a relatively large number of cassettes with different titles, automatically dispense a selected video cassette, and automatically store a video cassette upon its return to the machine so that the video cassette is appropriately positioned in the machine to be dispensed again without the intervention of a service operator.

According to one embodiment of the invention there is provided a machine for automatically dispensing a selected container from a store of containers and for automatically storing a container returned to the machine, including:

(a) an array of storage bins for storing a plurality of containers, each bin having a bottom provided with an elongated slot, the bins being arranged in a plurality of vertically stacked, horizontal rows, with a horizontal passage between each horizontal row and a vertical passage connecting the horizontal passages, and each container being stored in a respective one of the bins;

(b) a controllable arm mounted for relative movement through the horizontal and vertical passages between one position for dispensing a selected container and for receiving a returned container, and a second position corresponding to a selected one of the bins, the controllable arm being further mounted for movement through a respective one of the bins by passage through a respective one of the elongated slots; and (c) a control mechanism responsive to an input signal corresponding to a respective one of the bins and connected to the controllable arm for moving the controllable arm through the vertical and horizontal passages between the first and second positions and for moving the controllable arm through the elongated slot of the bin at the second position for one of removing a selected container from, and inserting a returned container into such bin.

This novel configuration of bins allows each bin to support a cassette and yet allow the controllable arm to pass through the bin via the elongated slot for the purpose of inserting or removing a cassette relative to the bin. Further, the arrangement of the bins in stacked horizontal rows permits each machine to store a relatively high variety of cassettes compared to presently known cassette vending machines.

The machine includes an electronic keyboard for accepting a user identification code and a cassette identification code. After verifying the user's identification code, the cassette identification code is entered and translated into control signals for moving the controllable arm to a position corresponding to the bin storing the selected cassette.

In another embodiment the controllable arm is controlled to move upwardly through the elongated slot for lifting the cassette out of the bin and into the horizontal passage above the row in which that bin is located. The arm is then controlled for transporting the cassette to a position in the machine at which the cassette may be dispensed to the customer.

The identification code of each cassette is provided in the form of a machine readable code, such as a bar code, on the outer surface of the cassette. When the cassette is returned to the machine the customer inserts the cassette into the controllable arm. A bar code reader senses the identification code of the cassette which is then translated into position control signals for moving the controllable arm to a position above the bin associated with the returned cassette. The controllable arm is then controlled for lowering the cassette into the bin. Preferably, after the cassette has been inserted into the bin the arm is returned to the dispensing and receiving position where it awaits the next sequence of position control signals associated with the next customer transaction.

In a preferred form of the invention the control means includes a mechanical linkage of ball screws and ball nuts which are controlled for moving the controllable arm to a desired position by appropriately programmed stepper motors.

In a further embodiment of the invention the controllable arm has two vertical extensions or prongs which are spaced apart and the controllable arm is controlled to move through the elongated slots in the bins in a horizontal direction so that the cassette is either pulled horizontally out of the bin or pushed horizontally into the bin by the controllable arm. In this embodiment the control mechanism is thus provided with a third axis of movement for moving the cassette in and out of the bin in a horizontal direction which is perpendicular to the plane in which the arm is controlled to move between a selected one of the bins and the dispensing and receiving position.

In accordance with the principles of the invention the horizontally stacked rows of bins may have a rectilinear configuration or a circularly cylindrical configuration. In the rectilinear configuration the mechanical linkage for moving the arm is located behind the bins relative to the front panel of the machine. In the circularly cylindrical configuration of the bins, the mechanical linkage is located in the interior space defined by the circularly cylindrical configuration of the bins.

In still another aspect of the invention, the machine may comprise two rectilinear sections of bins and the mechanical linkage of the control mechanism is configured for selectively moving the arm to an operative position relative to a respective one of the bin sections for retrieving or returning a cassette from or to any one of the bins in the entire machine.

According to yet another embodiment of the invention the machine includes a carriage means mounted for movement relative to the bins for transporting a container between a first machine position for dispensing a selected container and for receiving a returned container, and a second position corresponding to one of the bins, the carriage including lateral adjustment means for laterally adjusting the position of a container to a predetermined lateral position within the carriage means so that when the carriage means is at the second machine position the container will be centered relative to the bin. In this embodiment the controllable arm is mounted to the carriage means for movement therewith between the first and second machine positions and for movement relative to the carriage means along a horizontal path transverse to the horizontal passages between the rows of bins. Further, the controllable arm is provided with first and second vertical surfaces for engaging a container. A control means is provided which is responsive to an input signal which corresponds to one of the bins for moving the carriage means between the first and second positions and for moving the controllable arm along the horizontal path at the second position for one of removing a selected container from, or inserting a return container into the bin. The first vertical surface of the controllable arm is disposed for pushing a selected container out of its associated bin and into the carriage means when the controllable arm is controlled to move in one direction along the horizontal path, and the second vertical surface of the controllable arm is disposed for pushing a returned container from the carriage means into a bin when the controllable arm is controlled to move in the opposite direction along the horizontal path.

The lateral adjustment means establishes a predetermined lateral position of the cassette within the carriage means so that when the carriage means is adjacent a bin, the cassette will be centered with respect to the bin and will not catch a side wall edge of the bin when the cassette is moved from the carriage means to the bin.

According to a further aspect of this embodiment the lateral adjustment means includes pivotable side walls which can be spread apart for preventing the cassette from catching a side wall edge of the carriage means when the cassette is pushed by the controllable arm from a storage bin into the carriage means.

According to a further feature of this embodiment of the invention, the carriage means is also provided with a pivotable bottom platform which is pivoted so that the platform lies either above the bottom of a bin or below the bottom of a bin to prevent the cassette from catching a bottom edge of the bin or of the carriage means, respectively, depending on whether the cassette is being moved from the carriage means to the bin or vice versa.

According to yet another advantageous feature of this embodiment of the invention, there is provided a pivotable base plate adjacent the opening in the machine frame through which a cassette can be dispensed to a customer or a returned cassette can be delivered to the machine. The pivotable base plate is pivoted to be inclined upwardly toward the opening so that a cassette can be received from a customer through the opening and slid downwardly in the direction toward the carriage means after which the base plate is pivoted to a horizontal position so that the controllable arm can pull the cassette into the carriage means. When dispensing a cassette to a customer, the base plate is pivoted to have a downward incline toward the opening so the cassette removed from the carriage means by the controllable arm will slide downwardly toward the machine opening.

Other aspects and features of the invention will become apparent from the following detailed description taken in conjunction with the accompanying drawing Figures.

BRIEF DESCRIPTION OF THE DRAWINGS

FIG. 4 is a perspective view of components shown in FIGS. 2 and 3.

FIG. 5 is a cross-sectional plan view of components show in FIGS. 2 and 3.

FIG. 6 is a block circuit diagram illustrating the electronics utilized in the control mechanism of the invention.

FIG. 16 is a perspective view of components according to yet another modification of the invention.

FIGS. 17 and 18 are perspective views of a component according to further modifications of the invention.

DESCRIPTION OF THE PREFERRED EMBODIMENTS

Figure 1:
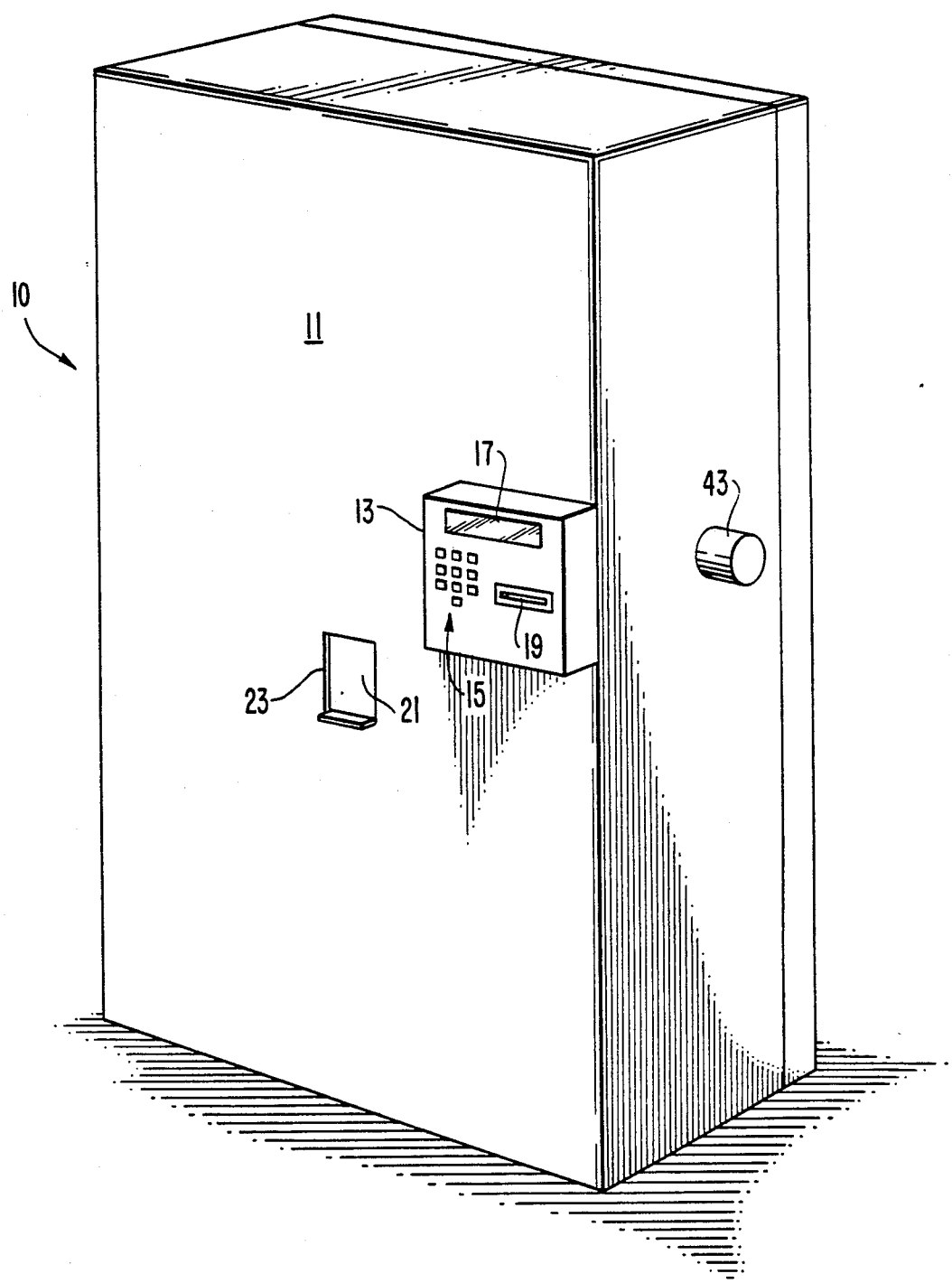
FIG. 1 is a perspective view of the exterior of the vending machine according to one preferred embodiment of the invention.

In FIG. 1 there is shown a perspective view of the outside frame of a video cassette vending machine 10 constructed according to the principles of the invention. The machine frame has a rectangular shape with a front panel 11 which mounts a computer console 13 housing known computer electronics (not shown) which are connected to an electronic keypad 15, a display panel 17 and a magnetic card reader (not shown) having a magnetic card insert slot 19. Console 13 operates in a manner similar to the consoles associated with the now well known automatic teller machines whereby a user inserts a magnetic card containing a preassigned identification code. The user then manually inputs via the keyboard 15 a personal identification code which is electronically confirmed by the console electronics, whereupon the user then proceeds with a transaction, which in the case of the present machine comprises the selection or return of a video cassette. For the selection of a cassette, the user, after confirmation of the personal I.D., will put in the identification code for the cassette containing the desired title. The display 17 is utilized in a well known manner for displaying user instructions and the keyboard entries. Consoles, such as console 13, and the associated electronics, are well known and form no part of the present invention.

Panel 11 contains an opening 21 which is shown as centrally disposed in the panel for reasons which will become apparent; however other locations for opening 21 are possible within the principles of the invention. Cassettes which are dispensed by the machine are automatically presented at the opening 21 for removal by the customer. Similarly, cassettes which are returned by the customer to the machine are inserted through opening 21 and are automatically stored in the appropriate position in the machine in a manner which will be described. Preferably, opening 21 has a door 23 which is slidably mounted and controllable by signals from the console 13 for covering and uncovering opening 21. Preferably, opening 21 remains covered by door 23 except when a selected cassette is to be disposed through the opening 21 or when a customer returns a cassette to the machine and makes an appropriate entry through the keyboard for opening the door 23 so that the cassette can be inserted into the machine.

Figure 2:
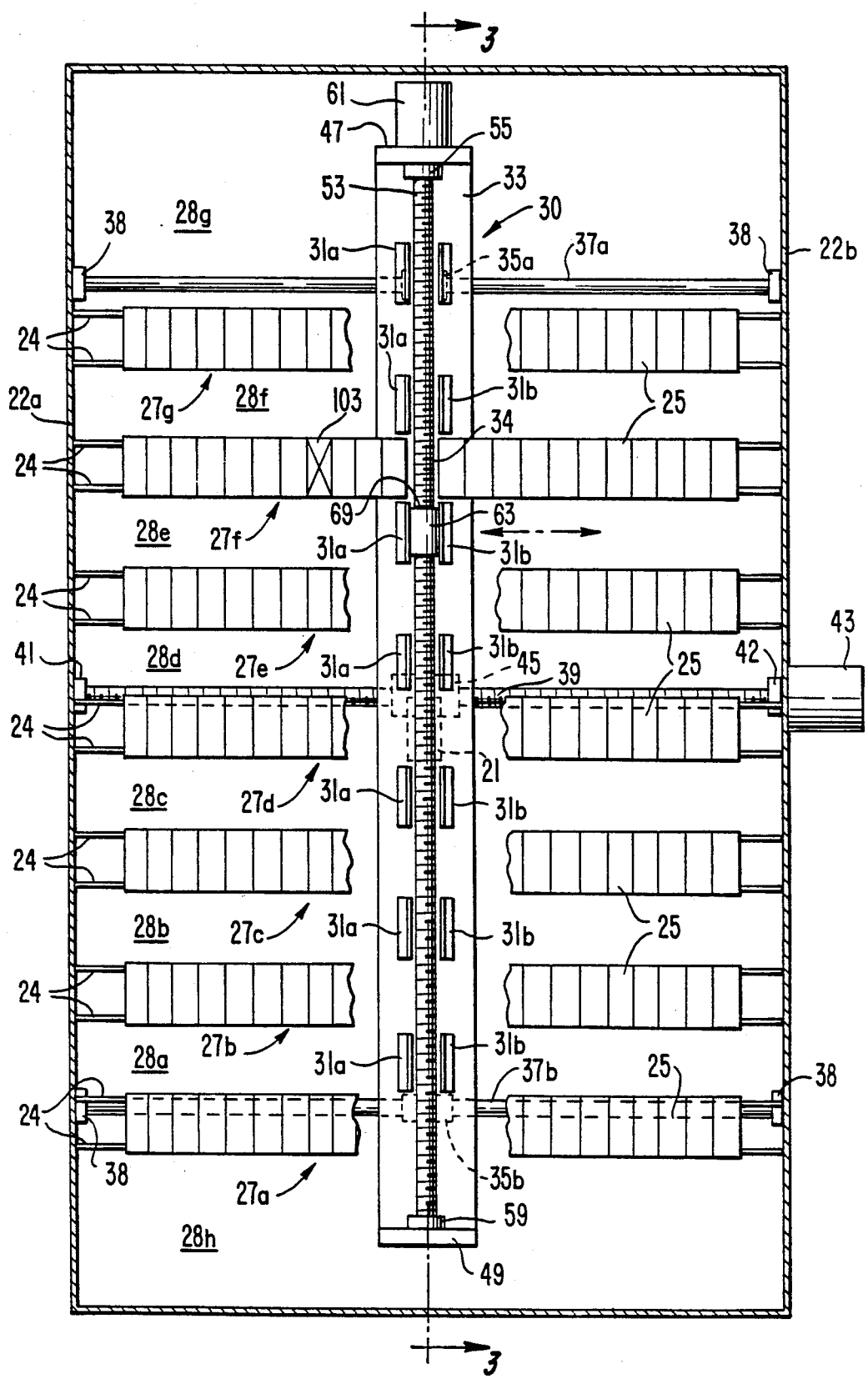
FIG. 2 is a schematic showing a front elevational view in partial cross section of the machine of FIG. 1 with the front panel removed.
Figure 3:
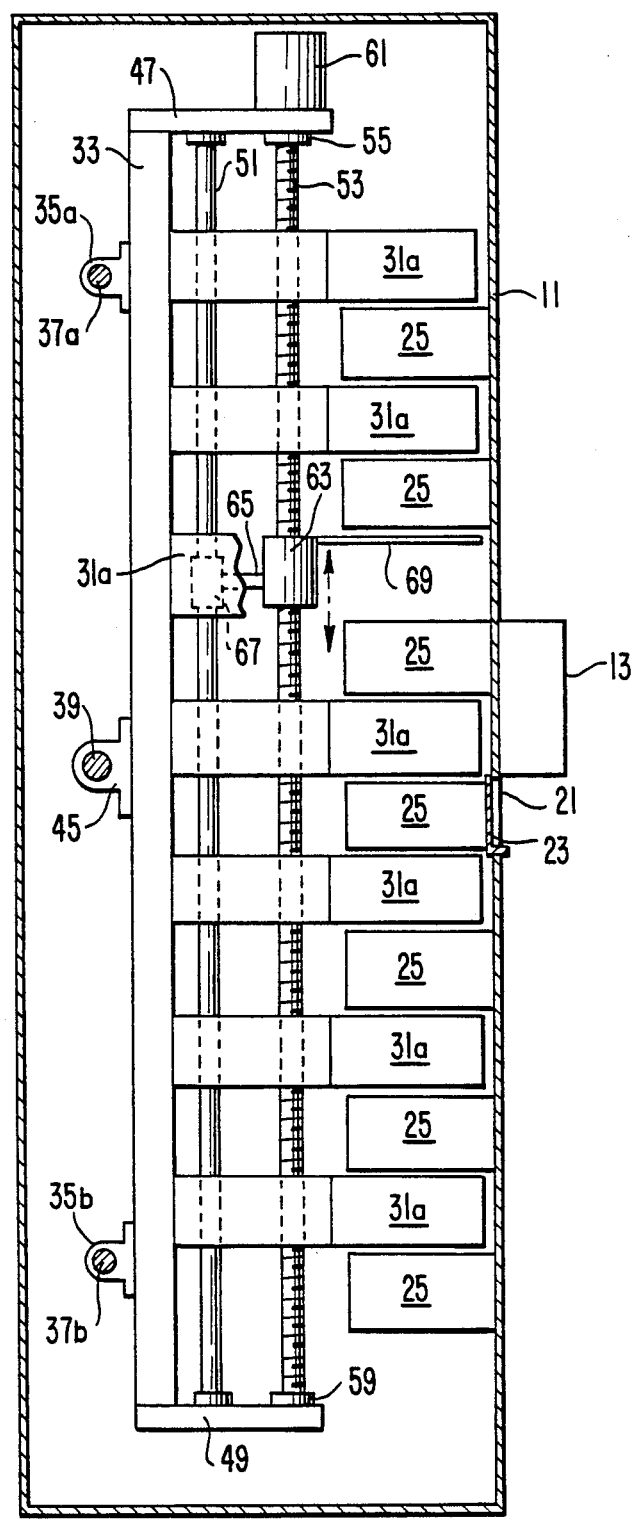
FIG. 3 is a schematic of a side elevational view in partial cross section of the machine shown in FIG. 1.

FIGS. 2 to 5 illustrate the principal components within the machine illustrated in FIG. 1 according to one embodiment of the invention. Referring to FIG. 2 there is shown the machine frame in section having side panels 22a and 22b to which are connected a plurality of mounting brackets 24. A plurality of cassette storage bins 25 are suitably connected to mounting brackets 24 in a rectilinear array of vertically stacked, horizontal rows 27a-27g. The horizontal rows 27a-27g are spaced from one another to define horizontal passages 28a-28f between the rows. Additionally, there is provided a horizontal passage 28g above the uppermost row 27g and a horizontal passage 28h below the lower most row 27a. Horizontal passages 28a-28g accommodate the horizontal movement of a cassette carriage 30 which has a plurality of pairs of side wall sections 31a and 31b mounted on a support 33 and protruding into the space immediately above each respective row of bins as illustrated in FIGS. 2 and 3. Bins 25 are further arranged to define a vertical passage 34 which communicates with each of the horizontal passages 28a-28h and with opening 21.

Two linear bearings 35a and 35b are connected near the bottom and top, respectively, of support 33 for guiding the horizontal movement of support 33 with its attached pairs of side wall sections 31a and 31b along respective linear bearing rods 37a and 37b. Linear bearing rods 37a and 37b are fixedly attached to the frame of the machine via suitable attachment members 38 as shown in FIG. 2.

A ball screw 39 is mounted to side panels 22a and 22b of the machine frame via bearing blocks 41 and 42 so as to be parallel with the linear bearing rods 37a and 37b. Ball screw 39 is drivingly connected to a reversible stepper motor 43. A ball nut 45 is attached to support 33 and is operatively engaged with ball screw 39 for moving the entire cassette carriage 30 to the left or right as shown by the arrows in FIG. 2 in response to a clockwise or counterclockwise rotation of ball screw 39.

A top end piece 47 is attached to the upper end of support 33 and a bottom end piece 49 is attached to the lower end of support 33. Between end pieces 47 and 49 there is mounted a vertically oriented linear bearing rod 51 (FIG. 3) and a ball screw 53 which is spaced from and parallel to the linear bearing rod 51. Ball screw 53 is mounted to end pieces 47 and 49 via respective bearing blocks 55 and 59 and is drivingly connected to a reversible stepper motor 61. A ball nut 63 is operatively engaged with ball screw 53 and is attached via a bracket 65 to a linear bearing 67 which is slidably engaged with linear bearing rod 51. Carriage 30 further includes a cassette lifting arm 69 which is attached to ball nut 63 and cooperates with the respective side wall sections 31a, 31b for transporting a selective one of the cassettes as will be described hereinafter. Ball nut 63, and hence arm 69, are caused to move in a vertical direction as shown by the arrow in FIG. 3 upon the rotation of ball screw 53 by stepper motor 61.

FIG. 4 shows an enlarged view of a cassette storage bin 25 in operative relation with a pair of side wall sections 31a and 31b directly above the bin and the cassette lifting arm 69 which, in this illustration is located below bin 25. Bin 25 is shaped to support a cassette (shown by phantom lines) on its edge and includes opposing side walls 71 and 73 each of which are preferably outwardly flared at their respective upper edge portions for reasons which will become apparent. Bin 25 has an end wall 75 via which the bin is mounted adjacent the inside of the machine front panel 11. The bottom of bin 25 is formed by two flanges 77 and 79 which project inwardly of the bin from a respective one of the side walls 71 and 73 to form an elongated slot 81. Flanges 77 and 79 are dimensioned to provide adequate support for the cassette as shown in FIG. 4. Slot 81 has a width which prevents the cassette from falling therethrough but yet permits the passage of arm 69 in the vertical direction as shown by the arrow in FIG. 4. Preferably, the end of bin 25 remote from the front panel of the machine is also provided with opposing flanges 83 and 85 which define a slot 87 corresponding to slot 81 and which thus has a width which permits passage of arm 69. Flanges 83 and 85 prevent the cassette from falling out of the bin if the machine is tilted or violently jarred.

As can be seen in FIG. 4, the bottom edge portions of side wall sections 31a and 31b, respectively, are flared outwardly. The purpose of the outward flaring of the bottom edge portions of side wall sections 31a and 31b and the outward flaring of the upper edge portions of side walls 71 and 73 of bin 25 is to allow a greater tolerance for error in the alignment of the side wall sections of the carriage with the bin during retrieval or storage of a cassette. Thus, when a cassette is retrieved from a bin, arm 69 will be moved up through slot 81 in bin 25 to lift the cassette into the pair of side wall sections 31a and 31b immediately above the bin. If the side wall sections 31a and 31b are not precisely aligned directly above the bin, the outward flaring of the bottom edge portions of side wall sections 31a and 31b will nevertheless force the cassette into the space between the side wall sections. Similarly, during the storage of a cassette into the appropriate bin, the carriage is moved so that the side wall sections 31a and 31b are aligned directly above the appropriate bin and the cassette lifting arm 69 along with the cassette to be stored is lowered into the bin until the cassette rests on flanges 77 and 79. A slight misalignment of the side wall sections 31a and 31b with the bin will not affect the storage operation since the outward flaring of the upper edge portions of bin 25 will guide the cassette into the bin.

FIG. 5 shows an enlarged sectional plan view of the carriage 30 with the cassette lifting arm 69 disposed in the vertical passage 34. The side walls of the bins adjacent passage 34 are preferably not flared at their upper edge portions, or are provided with a false wall (not shown) which is flared outwardly relative to passage 34, so that a cassette being transported through vertical passage 34 via arm 69 will not catch an edge of the bin walls adjacent passage 34.

From the foregoing description of FIGS. 2 to 5 it may be appreciated that the mechanical linkage comprising the ball screws and ball nuts permits the cassette lifting arm 69 to be moved via vertical passage 34 to any one of the horizontal passages 28a-28h. The entire carriage 30 may be moved in a horizontal direction so that the side wall sections 31a and 31b are aligned with either vertical passage 34 or with a selected one of the bins. Once aligned with a selected bin, the arm 69 can be controlled to move up or down through the vertical slot of the selected bin for retrieving or storing a cassette.

FIG. 6 illustrates a block circuit diagram of an electronic circuit which may be used to control the stepper motors which drive the ball screws and ball nuts shown in FIGS. 2 to 4. The computer console 13 is connected, via a parallel/serial interface 89, to a stepper motor controller 91 for controlling vertical movement of arm 69 and to a horizontal stepper motor controller 93 for controlling horizontal movement of carriage 30. Stepper motor controller 91 is connected via a drive 95 to stepper motor 61 and stepper motor controller 93 is connected via a drive 99 to stepper motor 43.

The parallel/serial interface 89 may be a large scale integrated device such as that made by Cybernetic Microsystems and sold under the Part No. CY232. The parallel/serial interface translates keyboard inputs to TTL outputs. Stepper motor controllers 91 and 93 each may be implemented by an intelligent positioning stepper motor controller such as that made by Cybernetic Microsystems and sold as Part No. CY512 which is also a large scale integrated device. The CY512 stepper motor controller is a programmable device which can accept an input signal representing a target position and control the direction, position, speed and acceleration of a stepper motor. Handshaking between stepper motor controllers 91 and 93 occurs via interface 89 under control of a handshaking algorithm as will be appreciated by those skilled in the art. Preferably, a four phase stepper motor is used in combination with each CY512 stepper motor controller. The drive circuits 95 and 99 each comprise standard power transistors or transistor arrays configured in a known manner for accepting the TTL outputs of the stepper motor controllers. Other commercially available electronics are equally suitable for implementing the control of the stepper motors in carrying out the invention, and such electronics, per se, form no part of the present invention. For example, Clifton Precision Litton, Inc. also makes a Programmable Stepper Controller sold under Model No. SCC20, and compatible drivers and interfaces which could be connected and readily programmed to control the stepper motors according to the invention.

The operation of the vending machine according to FIGS. 1 to 6 will now be described. There will first be a description of the operation of the machine in retrieving and dispensing a cassette in response to a selection made by a customer, followed by a description of the operation of the machine in accepting a cassette which has been returned to the machine and storing the returned cassette in the appropriate cassette storage bin.

A person wishing to utilize the video cassette vending machine according to the invention would have to be equipped with a magnetic strip containing a personal identification code which must be obtained in advance of using the machine. To request a particular video cassette, the person would insert the magnetic card in the slot 19 and also enter the personal identification code or key number via keyboard 15. If the identification code entered via the keyboard matches that contained on the magnetic card the display 17 will so indicate and then instruct the person to enter a command corresponding to the identification code for the desired cassette. After entry of the cassette identification code, which will be displayed on display panel 17, the customer will have the opportunity to either cancel the entry or to continue the transaction with the entered cassette identification code by pressing an entry key which will activate the machine to automatically retrieve and dispense the selected cassette in the following manner.

The computer console 13 contains a read only programmable memory (not shown) which contains an inventory file of the location of each cassette in the array of storage bins. The location data stored in the inventory file memory may be in terms of a cartesian coordinate system having an origin corresponding to the center of opening 21 in panel 11 (see FIGS. 1 and 2), the abscissa (x) axis corresponding to row 27d and the ordinate axis (y) corresponding to vertical passage 34. Thus the ordinate is measured in terms of the row number above or below the origin and the abscissa in terms of the bin number to the right or left of the origin.

The location data is transmitted through a serial port of the computer console 13 to the parallel/serial interface 89 which in turn addresses and transmits the appropriate location data to a respective one of the stepper motor controllers 91 and 93. Stepper motor controller 91 contains the program required to achieve the vertical movements of the carriage 30 and the cassette lifting arm 69 in the sequence for retrieving the cassette, and stepper motor controller 93 contains the program required to achieve the horizontal movements of carriage 30 in the retrieval sequence.

Assume that the cassette selection code identifies the cassette located in the bin having an abscissa of −4 and an ordinate of +2 (i.e. the fourth bin to the left of vertical passage 34 in row 27f). This bin is identified by an X in FIG. 2 and is denoted by the reference numeral 103. Assume further that the side wall sections 31a and 31b are initially aligned with vertical passage 34 (the ordinate axis) and that the platform of the cassette carriage is at a vertical position corresponding to the 0,0 coordinate position, i.e. at the vertical level corresponding to the base of opening 21, which will hereinafter be referred to as the home base position. Preferably, the cassette carriage and lifting arm will always be returned to the home base position at the end of a retrieval sequence or a storage sequence; however, by suitably programming the computer and the stepper motor controllers, the cassette lifting arm need not necessarily be located at the 0,0 position at the beginning of a sequence.

To retrieve the cassette from the −4, 2 position, stepper motor controller 91 pulses driver 95 so that stepper motor 61 turns ball screw 53 in a direction which moves ball nut 63 upwardly to a position at which the cassette lifting arm 69 is vertically located just below the bins in row 27f. There is then a sufficient delay in the operation of stepper motor 61 to permit stepper motor controller 93 to pulse driver 99 for causing stepper motor 43 to move ball nut 45 leftwardly in FIG. 2 until the side wall sections 31a and 31b are aligned with the side walls of bin 103 which contains the selected cassette. The program of stepper motor controller 93 then delays while stepper motor controller 91 takes over to cause stepper motor 61 to rotate ball screw 53 for causing ball nut 63 and cassette lifting arm 69 to move upwardly through the vertical slot in bin 103, lifting the selected cassette into the side wall sections 31a and 31b located in the horizontal passage 28f immediately above bin 103. As soon as the cassette lifting arm 69 clears the upper edges of bin 103, the program of stepper motor controller 91 delays further operation of stepper motor 61 while stepper motor controller 93 takes over to cause stepper motor 43 to turn ball screw 39 in a direction which will cause ball nut 45 to move rightwardly in FIG. 2 until sections 31a and 31b are in vertical alignment with the side wall surfaces of the bins on either side of the vertical passage 34. With ball nut 45 in this position, cassette lifting arm 69 may be lowered to the home base position at opening 21 for dispensing the cassette to the customer. It may be appreciated that, as cassette lifting arm 69 is lowered in the vertical passage 34, the side wall sections 31a and 31b and the side walls of the bins adjacent vertical passage 34 alternatively provide a lateral guide and support for the cassette. Additionally, the outward flaring of the upper edge portions of the side wall sections 31a and 31b (FIG. 4) ensure that the cassette will not be caught on an edge of such side wall sections as the cassette is being lowered to the home base position. The outward flaring of the bottom edge portions of the side wall sections 31a and 31b serve the same purpose when a cassette is lifted up through vertical slot 34.

When the cassette lifting arm 69 arrives at the home base position of opening 21, the door 23 is opened and the cassette may be removed by the customer. Preferably, the door will either automatically be opened by a control mechanism (not shown) which receives an activation signal from the computer console 13 at the end of the automatic sequence by which the cassette is retrieved from its storage bin and brought to the home base position. Alternatively, the door 23 may be kept closed by an automatic latch mechanism (not shown) which is released by a signal from the computer console 13 at the time that the cassette is delivered to the home base position.

A cassette which a customer returns to the machine is automatically stored by the vending machine according to the invention by the following operational sequence. The customer would again insert the magnetic card containing the customer personal identification code into slot 19 and enter his personal identification code. If there is a match between the keyboard entry and the personal identification code contained on the magnetic card, an appropriate indication will be indicated by the display panel 17. The customer then pushes an appropriate one of the keys of keyboard 15 to instruct the machine that he wishes to effect a return transaction. Computer console 13 will then be responsive to send a signal for opening door 23 so that the customer may insert the video cassette being returned into opening 21 and rest it on the cassette lifting arm 69 which will have previously been returned to the home base position. A bar code reader (not shown) is suitably positioned for reading the bar code which is present on the exterior of the cassette as earlier noted. The bar code corresponds to the identification code of the cassette and thus identifies the preassigned bin in which the cassette is to be stored. Alternatively, the machine can be appropriately programmed to store the cassette being returned into any one of the storage bins which are empty at the time that the cassette is returned to the machine. In this event, the file memory would be automatically updated to reflect the new location of the returned cassette.

The sequence of operation of stepper motors 61 and 43 for storing the cassette into the appropriate bin is similar to the sequence of operations discussed above in connection with the retrieval of a cassette during the dispensing operation. The primary difference is that the cassette lifting arm 69 is controlled to move to the horizontal passage just above the row containing the bin in which the cassette is to be stored so that the cassette can be lowered into the bin.

For example, consider a cassette which is to be returned to bin 103 having the coordinates −4, 2 as illustrated in FIG. 2. The identification number on the exterior of the cassette is read by the bar code reader and sent to the computer which locates in the inventory file the assigned storage bin for that cassette, which in this example is bin −4 in row +2. The computer transmits the location data through a serial port to the parallel/serial interface controller 89 which in turn transmits the location data to a respective one of the stepper motor controllers 91 and 93 which are programmed to achieve the necessary horizontal and vertical movement of carriage 30 and cassette lifting arm 69 to store the cassette in preassigned bin 103 and to return the cassette lifting arm to home base. Accordingly, stepper motor controller 91 will initially pulse drive 95 for causing stepper motor 61 to rotate ball screw 53 in a direction which will cause ball nut 63 to rise until cassette lifting arm 69 reaches a position in vertical passage 34 which is just above row 27f in which bin 103 is located. Stepper motor controller 93 then takes over to pulse drive 99 for causing motor 43 to move ball nut 45 and hence the entire carriage 30 leftwardly in FIG. 2 until side sections 31a and 31b are aligned with the side walls of bin 103. Stepper motor controller 91 then activates stepper motor 61 for turning ball screw 53 in a direction for moving cassette lifting arm 69 downwardly through the vertical slot in bin 103 so that the cassette comes to rest on the flanges at the bottom of the bin. Cassette lifting arm 69 continues to move downwardly until it is in the space of the horizontal passage 28e immediately below bin 103 at which time stepper motor controller 93 activates stepper motor 43 which causes ball nut 45 to move horizontally to the right in FIG. 2 until the side wall sections 31a and 31b become aligned with the vertical passage 34. Stepper motor controller 91 then activates stepper motor 61 for vertically moving cassette lifting arm 69 downwardly to the home base position in preparation for the next transaction.

It may thus be appreciated from the foregoing description that the arrangement of the bins in vertically stacked, horizontal rows, with horizontal passages above and below each row connected by a vertical passage, and with each bin configured to have a vertical slot through which the cassette lifting arm can pass, the mechanical linkage for moving the carriage, including the cassette lifting arm, can be relatively simple in that it requires movement in only two dimensions. Further, while the mechanical linkage described above for effecting the required horizontal and vertical movements is composed of interlinking ball screws and ball nuts, those skilled in the art will appreciate that other types of mechanical linkages may be employed to effect the required movements. It should further be appreciated that the central location of opening 21 creates the shortest distance between home base and any selected bin.

Figure 7:
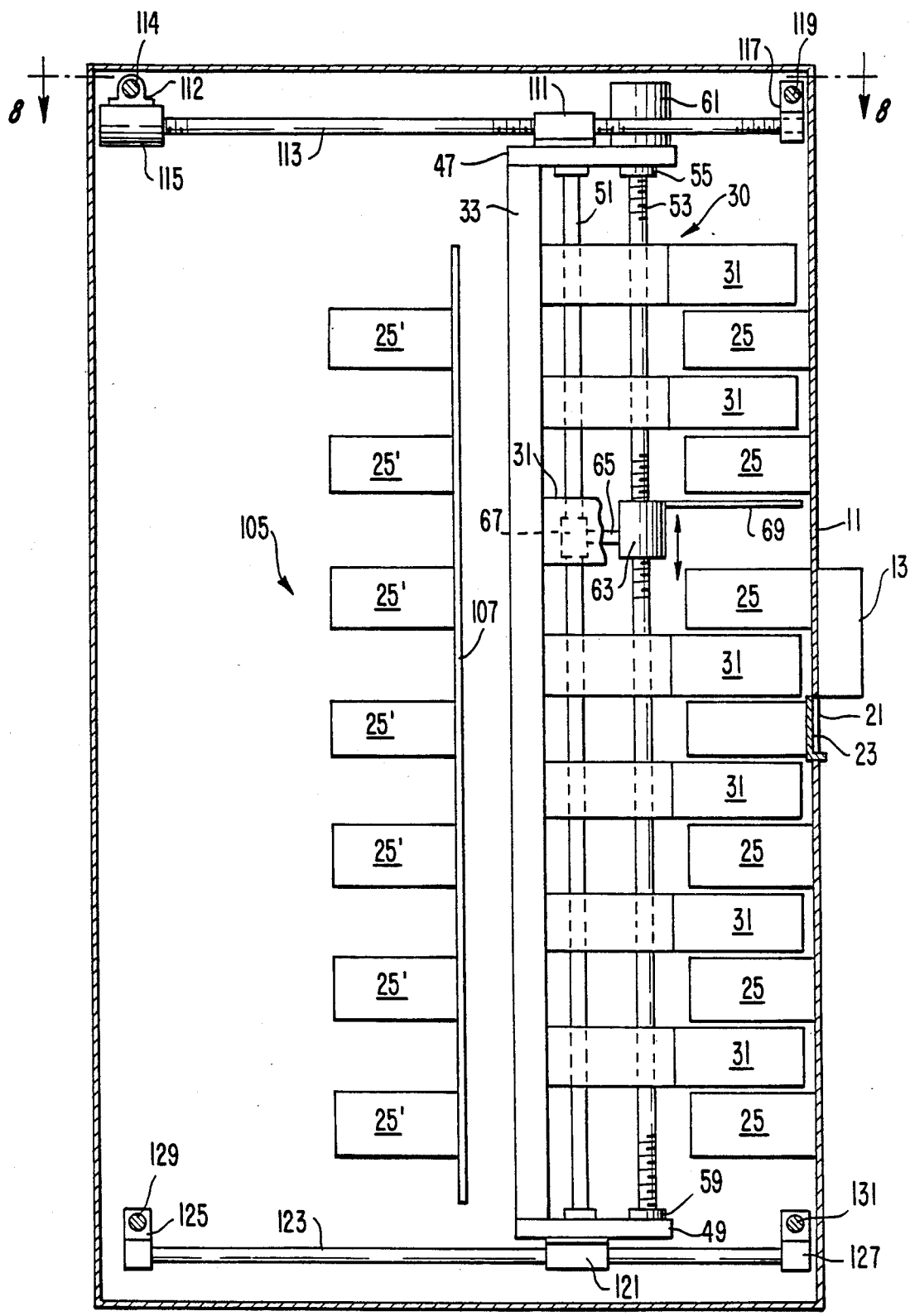
FIG. 7 is a schematic of a side sectional view of a machine according to the invention employing two sections of bins.
Figure 8:
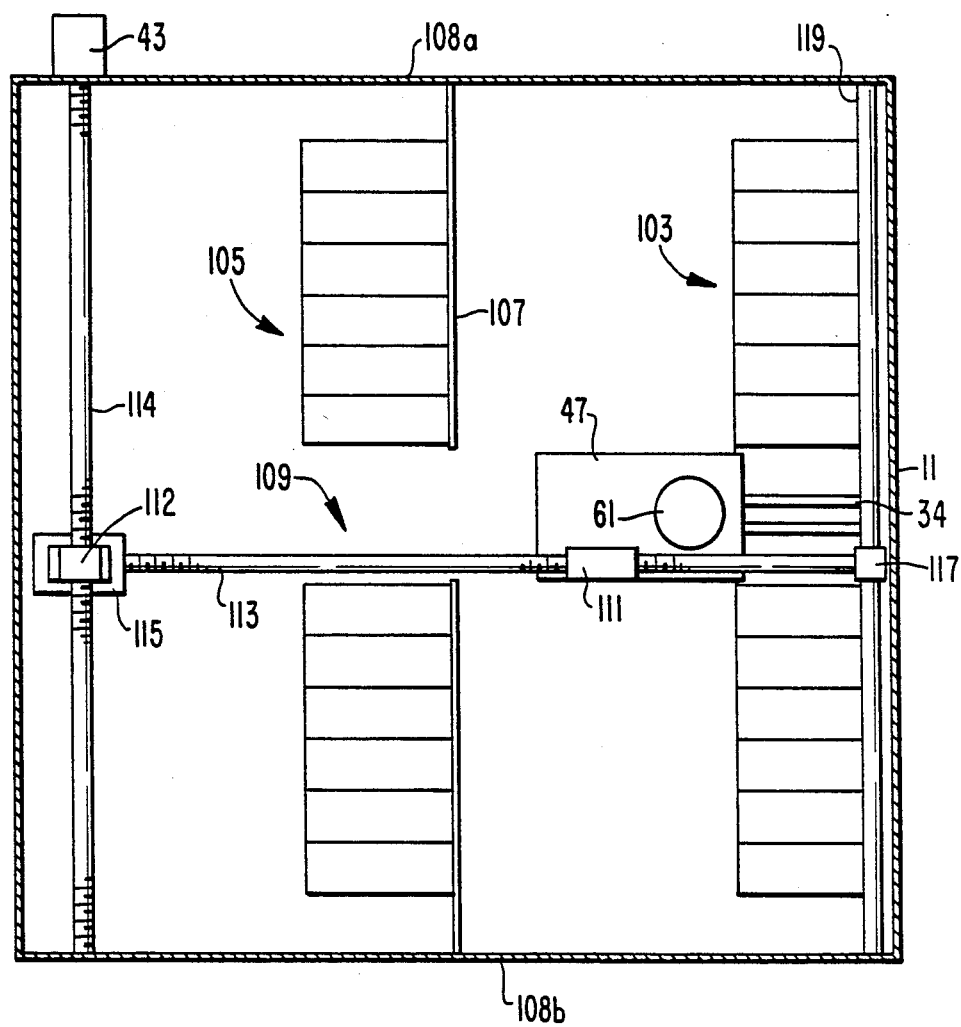
FIG. 8 is a schematic showing a plan sectional view of the machine according to the embodiment of FIG. 7.

A modification of the embodiment shown in FIGS. 2 and 3 is illustrated in FIGS. 7 and 8 whereby the number of storage bins in the machine is nearly doubled. In the embodiment illustrated in FIGS. 7 and 8 there are two bin sections 103 and 105. Bin section 103 is adjacent the front panel 11 and includes bins 25 which are arranged in vertically stacked, horizontal rows in the same manner as the like numbered bins in FIGS. 2 and 3. Bin section 105 is located behind bin section 103, relative to front panel 11, by a sufficient distance to accommodate movement behind bin section 103 of the carriage including support 33, side wall sections 31a and 31b, linear bearing rod 51, ball screw 53, etc., which have been described in connection with the embodiment illustrated in FIGS. 2 and 3.

Bin section 105 comprises bins 25' which are attached to a backing member 107 which in turn is suitably fixed to the side panels 108a and 108b of the machine frame. Bins 25' are arranged in vertically stacked, horizontal rows in the same manner as bins 25 and thus define horizontal passages above and below each bin and a vertical passage 109 connecting the horizontal passages above and below each horizontal row of bins 25'.

In the embodiment of FIGS. 7 and 8 end piece 47 of carriage device 30 is connected to a ball nut 111 which is operatively engaged with ball screw 113 which has one end drivingly connected to stepper motor 115 and the other end rotatably connected to a linear bearing 117. Linear bearing 117 is in sliding engagement with a linear bearing rod 119. Stepper motor 115 is attached to a ball nut 112 which is operatively engaged with a ball screw 114. Ball screw 114 is driven by stepper motor 43.

Bottom end piece 49 of carriage device 30 is fixed to a linear bearing 121 which is slidably engaged with a linear bearing rod 123 which is connected at both ends to respective linear bearing 125 and 127 which are in turn slidably engaged with linear bearing rods 129 and 131, respectively.

The mechanical linkage of FIGS. 7 and 8 is thus configured to provide three degrees of movement. The cassette lifting arm 69 can be moved in the vertical direction by virtue of its attachment to ball nut 63 which is driven by ball screw 53 in response to stepper motor 61 as discussed above in connection with FIGS. 2 and 3. According to the embodiment of FIGS. 7 and 8 the entire carriage 30 along with the cassette lifting arm 69 is movable between operating positions relative to each of sections 103 and 105 by the controlled movement of ball nut 111 along ball screw 113 in response to stepper motor 115. To permit the movement of support 33 from a position between sections 105 and 103 as illustrated in FIGS. 7 and 8 to a position behind bin 105, vertical passage 109 is made to be sufficiently wide to accommodate support 33. The movement of carriage 30 in a horizontal direction parallel to front panel 11 which effects the movement of side wall sections 31a and 31b through the horizontal passages defined by the vertically stacked, horizontal rows of each of the sections 103 and 105 is provided by ball nut 112 via ball screw 114 and stepping motor 43.

Motors 61 and 43 in FIGS. 7 and 8 are controlled by stepper motor controllers 91 and 93 in the same manner as previously described. Stepper motor 115 is controlled by an additional stepper motor controller 135 via a drive 137 as shown by the dotted lines in FIG. 6 for moving carriage 30 between the bin sections 103 and 105 depending upon the location of the bin which stores a selected cassette which is to be retrieved or in which a returned cassette is to be stored. Thus, if the cassette identification code entered by a customer via keyboard 15 identifies a cassette stored in one of the bins contained in section 105, the position control signals issued by the computer will cause stepper motor controller 135 to execute a program which will move carriage device 30 to a position behind section 105, after which stepper motor controllers 91 and 93 will execute the appropriate programs to retrieve the cassette from the appropriate storage bin and return the cassette lifting arm 69 to the 0,0 coordinates. Stepper motor controller 135 then will control stepper motor 115 to move carriage 30 forward to deliver the cassette to the home base position directly behind the door 23 where the cassette can be dispensed to the customer.

Figure 9:
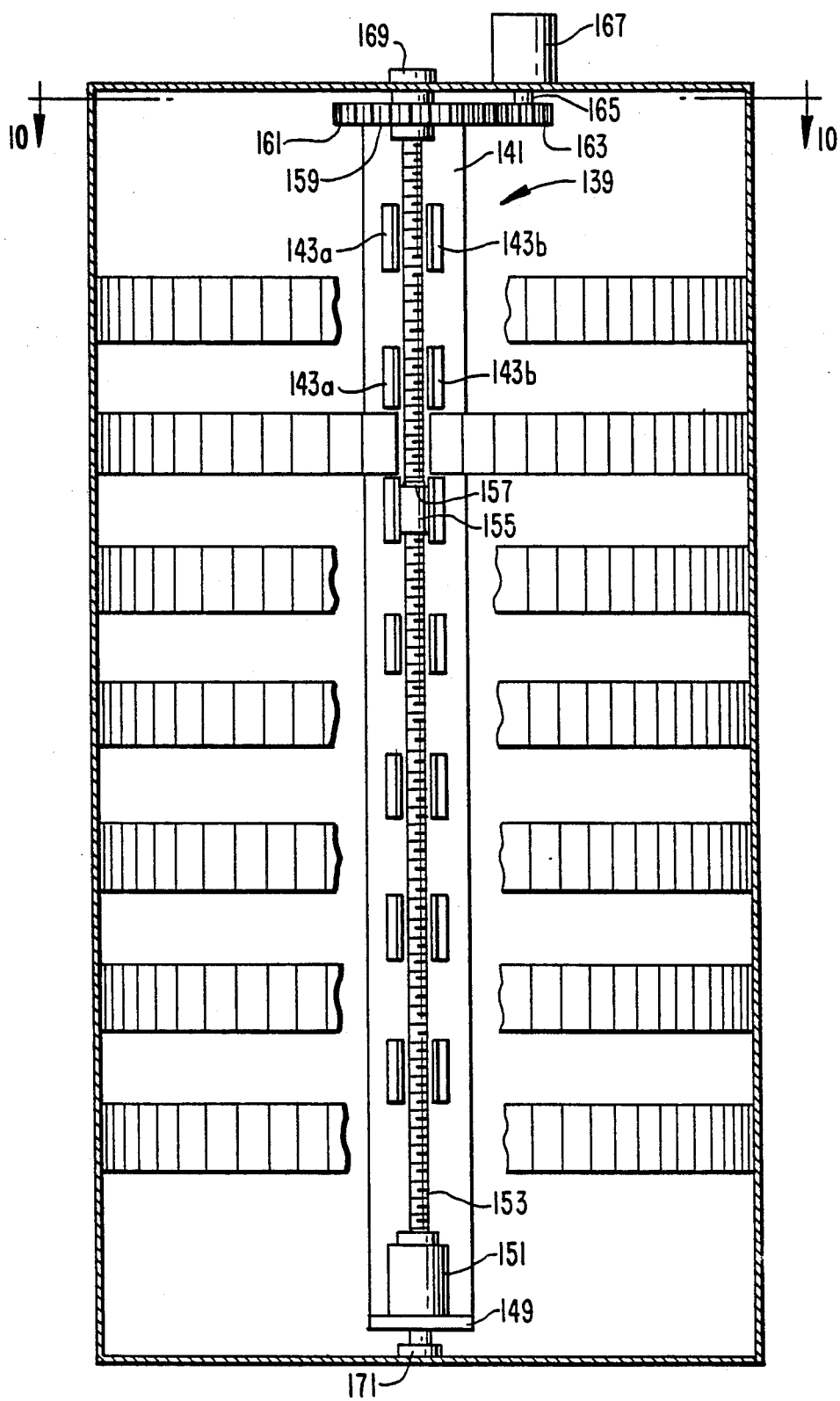
FIG. 9 is a schematic showing a front elevational view, in partial cross section, of the vending machine according to another preferred embodiment of the invention.
Figure 10:
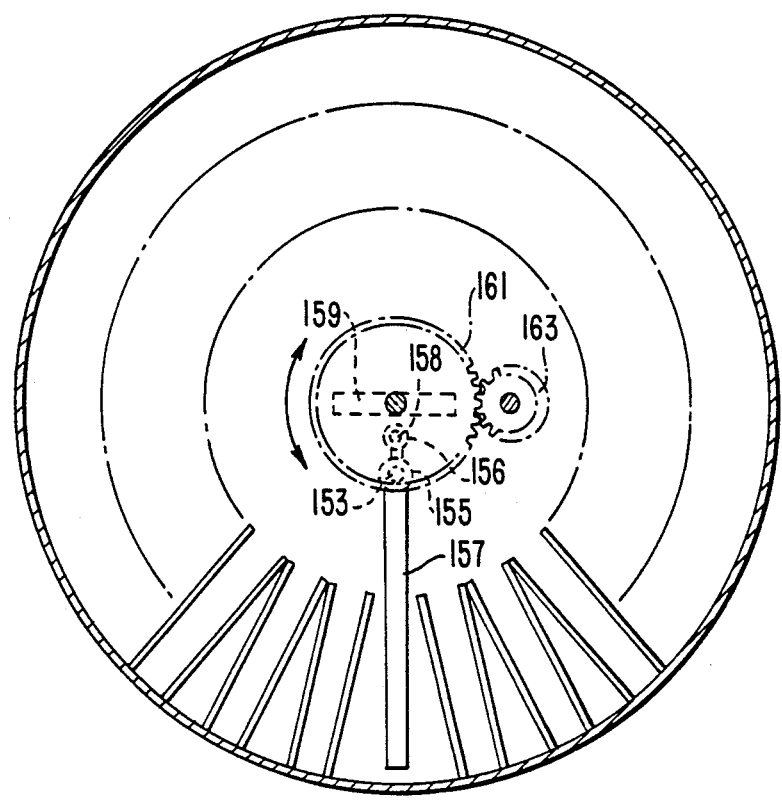
FIG. 10 is a schematic showing a cross-sectional view along the line 9—9 of FIG. 9.

FIGS. 9 and 10 illustrate another embodiment of the invention wherein the vertically stacked, horizontal rows of bins are in a circularly cylindrical configuration rather than a rectilinear configuration. Otherwise, the bins are arranged similarly to the arrangement in FIGS. 2 and 3, so that they define horizontal passages above and below each row of bins with a vertical passage connecting the horizontal passages. Further, each bin in FIGS. 9 and 10 includes a vertical slot as illustrated in FIG. 4. The embodiment of FIGS. 9 and 10 includes a carriage 139 which comprises a support 141 mounting side wall sections 143a and 143b in a manner similar to that described in connection with support 33 and side wall sections 31a and 31b in FIGS. 2 and 3. For ease of illustration side wall sections 143a and 143b are not shown in FIG. 10. Support 141 has a bottom end piece 149 which supports a stepping motor 151 which is drivingly connected to a ball screw 153 for moving a ball nut 155 and an attached cassette lifting arm 157 in the vertical direction similar to that described previously in connection with motor 61, ball screw 53, ball nut 63 and cassette lifting arm 69. For this purpose ball nut 155 is prevented from rotating by its connection to a linear bearing 156 which is slidably guided on a linear bearing rod 158. The upper end 159 of support 141 is connected to a gear 161 which is operatively engaged with a pinion 163 which in turn is connected to the shaft 165 of a stepper motor 167. Upper end 159 of support 141 is centered on a diameter of gear 161. Carriage 139 is supported at the top and bottom of the machine frame via bearing blocks 169 and 171 about which carriage 139 is pivoted. The axis of rotation defined by bearings 169 and 171 passes through the center of gear 161.

The operation of the circularly cylindrical configuration of FIGS. 9 and 10 is similar to the operation of the embodiment illustrated in FIGS. 2 and 3 except that the horizontal movement of the cassette lifting arm and the pairs of side wall sections 143a and 143b is circular rather than linear. The stepper motor 167 thus corresponds to stepper motor 43 in FIG. 6 and is controlled by an appropriately programmed stepper motor controller to cause carrier device 139 to pivot about the axis of bearing blocks 169 and 171 between the home position and the circumferencial position of a desired one of the cassette storage bins.

Figure 11:
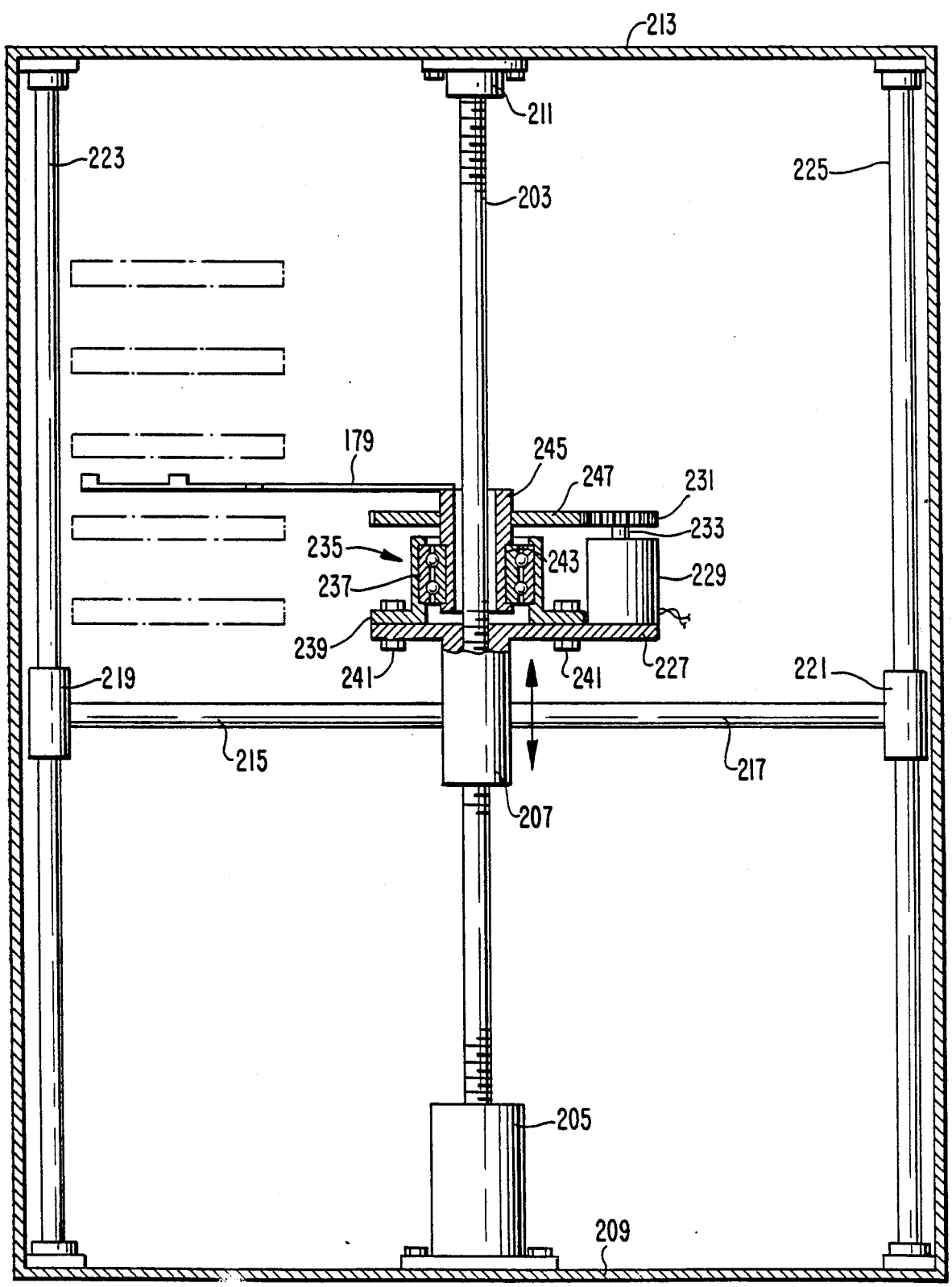
FIG. 11 is a front partial sectional view of a further embodiment of a machine according to the invention.
Figure 12:
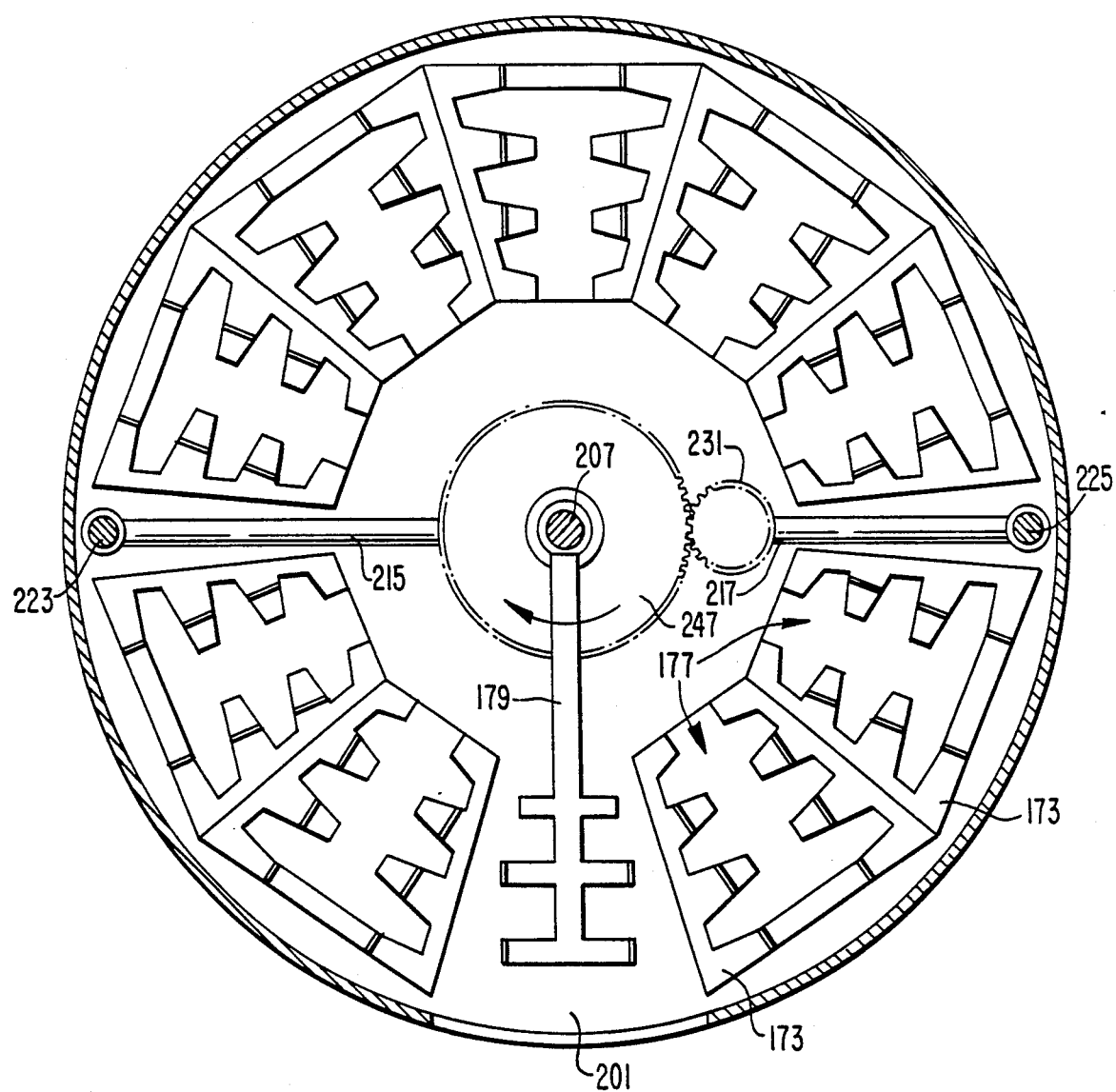
FIG. 12 is a cross-sectional plan view illustrating of the embodiment illustrated in FIG. 11.
Figure 13:
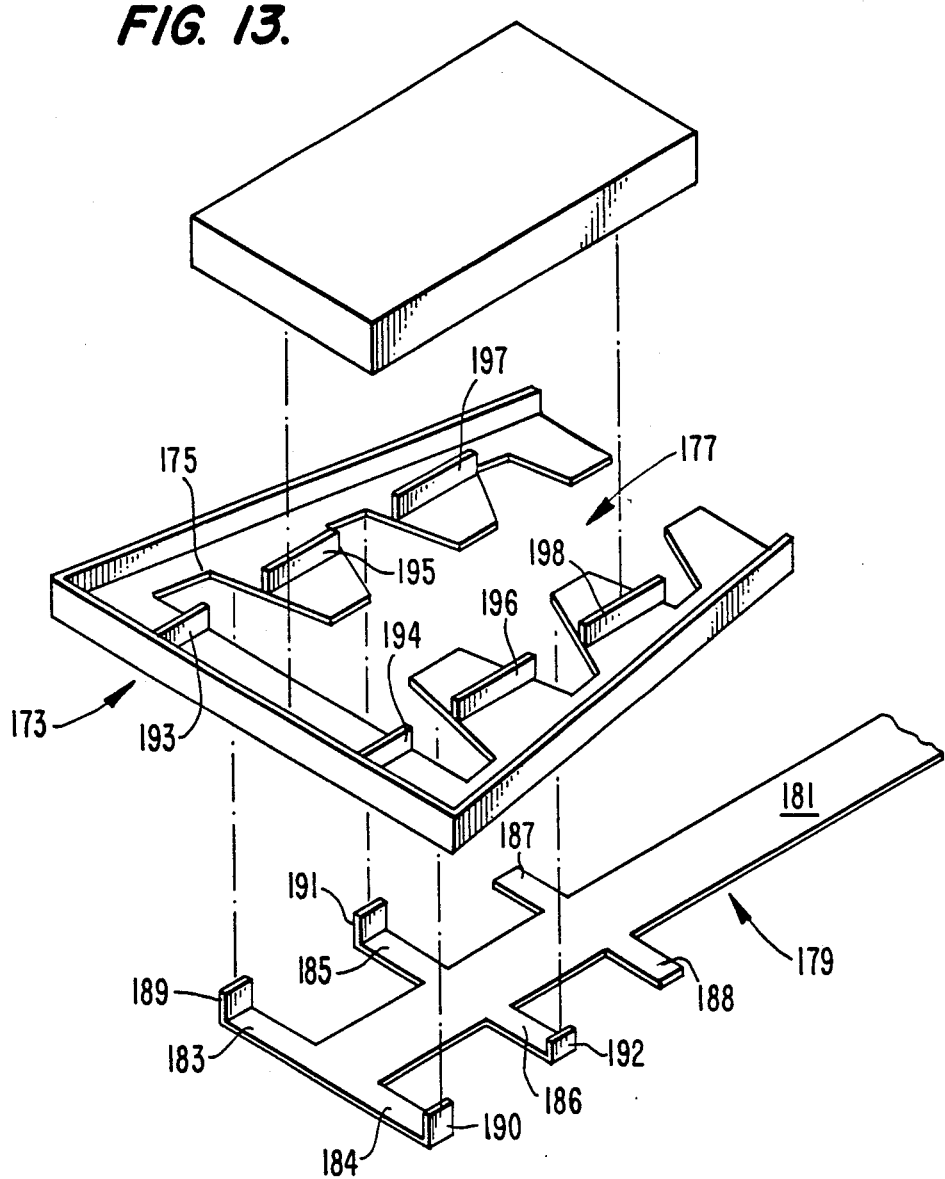
FIG. 13 is a perspective view showing components of FIGS. 11 and 12 on an enlarged scale.

FIGS. 11 to 13 illustrate another embodiment of the invention in which the storage bins are arranged in a circularly cylindrical configuration. In this embodiment the bins are again arranged to define horizontal passages above and below each row of bins and a vertical passage is likewise provided connecting the horizontal passages for vertical movement of the cassette lifting arm; however, the storage bins in this embodiment are each configured to support the cassettes on their broadside rather than their narrow end as described above in connection with other embodiments. The storage and transporting of the cassettes with the cassettes lying on their side rather than on their end eliminates the need for the likewise broad side wall sections of the carriage which are provided principally to prevent the cassette from falling off the cassette lifting arm during transport.

Referring first to FIG. 13, there is illustrated one example of the configuration of a storage bin and cassette lifting arm for storing and transporting the cassette on its broad side. The cassette storage bin 173 illustrated in FIG. 13 has a bottom surface 175 which is provided with an elongated slot 177 which, in accordance with the principles, of the invention, allows the passage of the cassette lifting arm 179 in a vertical direction through the bin for either lifting a cassette out of the bin or lowering a cassette into the bin. As can be seen, cassette lifting arm 179 has a main carrier portion 181 with opposite pairs of fingers 183 to 188 extending perpendicularly from the main section 181 for providing stable support for the cassette during transport. Preferably, at least some of the oppositely paired fingers projecting from main section 181 will have upwardly extending flanges such as shown by flanges 189 to 192. The slot 177 in bin 173 is shaped to correspond to the configuration of the arm 179 to permit passage of the arm therethrough but yet provide stable support for a cassette. The storage bin 173 is also preferably provided with projections, such as shown at 193 to 198, extending upwardly from the surface 175 for keeping the cassette centered in the storage bin. A variety of configurations for the storage bin and cassette lifting arm are possible for storing and transporting the cassette on its broad side and the specific embodiment illustrated in FIG. 13 is for purposes of illustration only. The essential feature is that the storage bin have an elongated slot for permitting the passage of the cassette lifting arm in a vertical direction through the bin for lifting a cassette out of or lowering a cassette into the bin.

FIG. 12 illustrates a plan view of a circular row of storage bins each shaped according to FIG. 13. The cassette lifting arm 179 is shown located in the vertical slot 201 which connects the horizontal passages above and below each row of bins.

FIGS. 11 and 12 together illustrate how the cassette lifting arm is moved in the vertical and horizontal directions in this embodiment. Referring to FIG. 11 there is shown a ball screw 203 which is drivingly connected with a stepper motor 205 for moving a ball nut 207 in the vertical direction. Motor 205 is connected to the bottom panel 209 of the machine frame. The upper end of ball screw 203 is rotatably engaged with a bearing block 211 which is fixed to the upper panel 213 of the frame. Ball nut 207 is connected by bars 215 and 217 to linear bearings 219 and 221, respectively, which are slidably engaged with respective linear bearing rods 223 and 225.

Ball nut 207 is provided with a platform 227 for supporting a stepper motor 229 which has a pinion 231 attached to its shaft 233. A bearing 235 is provided which surrounds ball screw 203 and which has an outer wall 237 which is fixed to platform 227 via a bracket 239 and bolts 241. Bearing 235 has an inner wall 243 which is fastened to a cylinder 245 adjacent to but spaced from ball screw 203. The cassette lifting arm 179 is fastened to cylinder 245. Cylinder 245 is also provided with a gear 247 which is drivingly engaged with the teeth of pinion 231.

It may be appreciated that stepper motor 205 provides the vertical movement to cassette lifting arm 179 via the ball nut 207 and ball screw 203, and the circular horizontal movement of cassette lifting arm 179 is provided by stepper motor 229 via the pinion and gear arrangement 231, 247 which rotates arm 179 relative to ball nut 207 by virtue of the arrangement of bearing 235.

Motors 205 and 229 are controlled by appropriately programmed stepper motor controllers as previously described in connection with FIG. 6 for causing the cassette lifting arm 179 to move from a home base position to the position of a bin in which a cassette is to be retrieved or in which a returned cassette is to be stored. As in the previous embodiments, to retrieve a cassette from a bin the cassette lifting arm is moved vertically through the vertical passage 201 to the horizontal passage immediately below the row containing the bin; the cassette lifting arm is then rotated to a position beneath the bin containing the selected cassette, raised up through the bin lifting the cassette into the horizontal passage immediately above the bin after which the cassette lifting arm is rotated back to the vertical passage 201 and moved vertically to the home base position for dispensing the cassette to the customer.

The sequence of horizontal and vertical movements for storing a returned cassette are similar to that just described for the retrieval of a cassette except that the cassette lifting arm is moved to the horizontal passage immediately above the bin in which the cassette is to be stored and the cassette lifting arm is then lowered through the vertical slot in the bin to rest the cassette on the bottom surface of the bin after which the cassette lifting arm is moved in the horizontal passage immediately below the row containing the bin in which the cassette was just stored back to the vertical passage where the cassette can be moved vertically back to home base.

Figure 14:
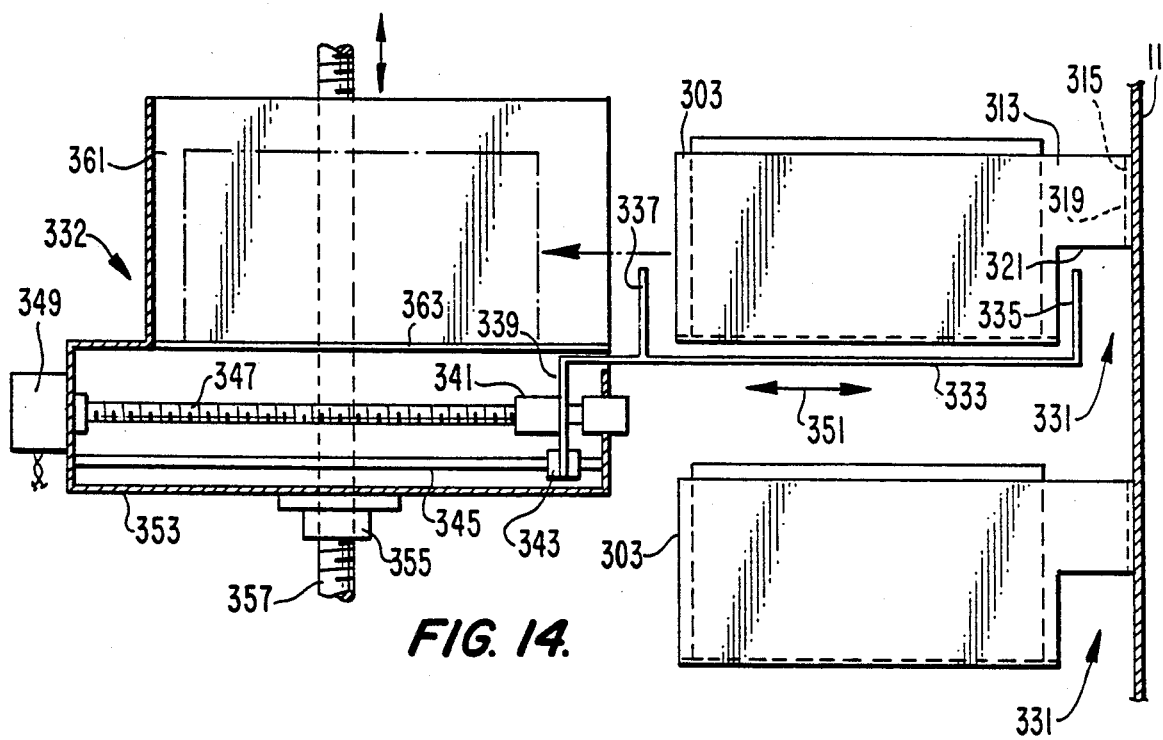
FIG. 14 is a side sectional view showing modified components of the machine according to another embodiment of the invention.
Figure 15:
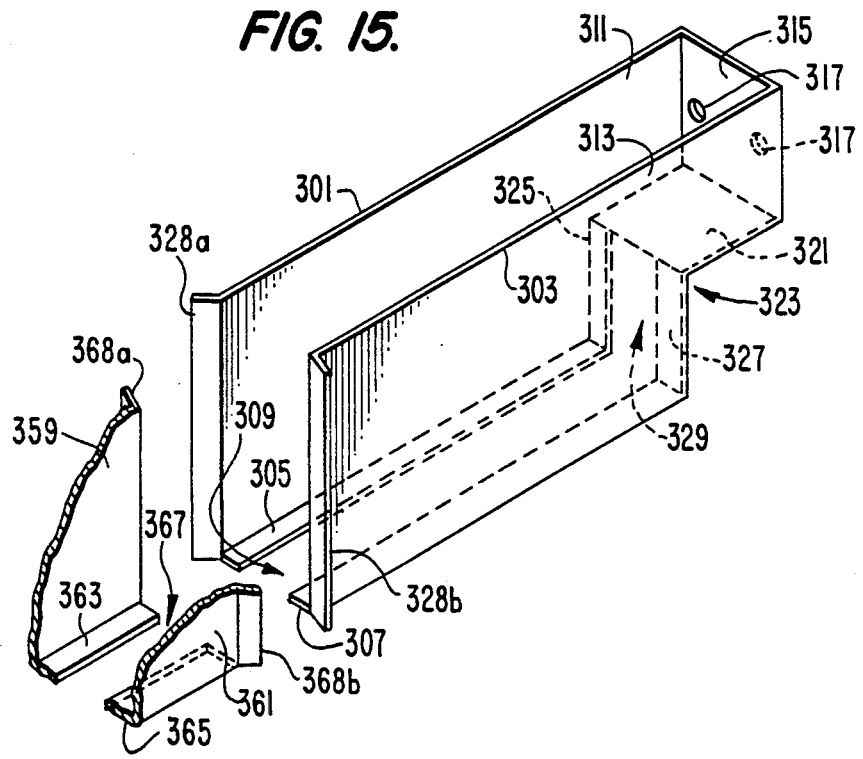
FIG. 15 is a perspective view of components illustrated in FIG. 14.

FIGS. 14 and 15 illustrate modifications to the bins and the carriage within the principles of the invention whereby the cassette is inserted into and removed from a bin in a horizontal direction rather than in a vertical direction as described above in connection with the other embodiments. The cassette storage bin, according to FIGS. 14 and 15, stores the cassette on end and has side walls 301 and 303 connected respectively to bottom flanges 305 and 307 which define a slot 309. Side walls 301 and 303 each have an elongated portion 311 and 313, respectively, which are connected to an end bracket 315 which is provided with openings 317 for the passage of screws 319 or other fastening means for fixing the bin to the front panel 11 of the vending machine. Elongated portions 311 and 313 are closed at their bottom by a member 321 which forms one leg of an inner angle corner 323. The other leg of corner 323 comprises a recessed end of the storage bin which is formed by two flanges 325 and 327. Flanges 325 and 327 form vertical extensions of the flanges 305 and 307, respectively, and define a slot 329 communicating with slot 309. Preferably, the vertical end edges of side walls 301 and 303 at the open end of the bin have outwardly flared portions 328a and 328b to accommodate slight misalignments between a bin and the carriage as previously discussed. A plurality of storage bins so constructed are connected to the front panel 11 of the machine in vertically stacked, horizontal rows, two of which are shown in FIG. 14. so as to define horizontal passages beneath each row and a vertical passage communicating with each horizontal passage. As can be seen a horizontal channel 331 is formed between the front panel 11 and the recessed ends of each bin.

In accordance with this aspect of the invention a carriage 332 includes a cassette lifting arm 333 which is provided at its free end with a first upward extension 335 which can ride in a horizontal direction in the channel 331 as explained below. Cassette lifting arm 333 is provided with a second upward extension 337 spaced from the first upward extension 335 by a distance greater than the length of the side walls between the recessed end defined by flanges 325 and 327 and the end of the side walls remote from front panel 11. At the end of cassette lifting arm 333 opposite the free end thereof with upward extension 335, there is connected a downward extending bracket 339 which is connected at an intermediate portion to a ball nut 341 and which has a free end connected to a linear bearing 343 which is in sliding engagement with linear bearing rod 345. Ball nut 341 is operatively engaged with ball screw 347 which is drivingly connected to a stepper motor 349. Stepper motor 349 is controlled by a programmable stepper motor controller such as one of those illustrated and described in connection with FIG. 6 for moving ball nut 341 and thus cassette lifting arm 333 in a horizontal direction indicated by the arrow 351 in FIG. 14.

Motor 349 is supported by a frame 353 which is attached to a ball nut 355 which is operatively engaged with a vertically oriented ball screw 357 for effecting vertical movement of carriage 332 under the control of a stepper motor and stepper motor controller as previously described in connection with the other embodiments. The carriage 332 illustrated in FIGS. 14 and 15 further includes side wall sections 359 and 361 which are connected to respective bottom flanges 363 and 365 defining a slot 367. Flanges 363 and 365 form a platform for supporting a cassette as will be described. Preferably side wall sections 359 and 361 are provided with outwardly flared end portions 368a and 368b, respectively, which again compensate for misalignments between the carriage and a bin.

In order to remove a cassette from a selected storage bin according to the embodiment of FIGS. 14 and 15, the ball nut 355 is moved via ball screw 357 so that the cassette lifting arm 333 is moved vertically in the vertical passage connecting the horizontal passages between the horizontal rows of bins until cassette lifting arm 333 is positioned in the horizontal passage beneath the row of bins in which the bin containing the selected cassette is stored. The carriage 332 shown in FIG. 14 is then moved horizontally, for example, by a ball screw, ball nut and stepping motor arrangement (not shown in FIG. 14) similar to that illustrated in FIGS. 2 to 5. The cassette lifting arm 333 would then move horizontally below the row with the upward extension 335 moving in the channel 331 and the second upward extension 337 moving behind the bin as illustrated in FIG. 14. When the upward extensions 335 and 337 of arm 333 are aligned with the slots 309 and 329 of the bin containing the selected cassette, the cassette lifting arm 333 is retracted via the ball nut 341, ball screw 347 and stepper motor 349. In this process the upward extension 337 passes through slot 367 of the carriage platform and upward extension 335 passes through slots 329 and 309 of the bin and partially through slot 367 of the carriage as the cassette is pulled into the carriage until it reaches a position shown by the phantom lines in FIG. 14. At that point the cassette is resting on flanges 363 and 365 of the carriage.

It may be appreciated that in retrieving a selected cassette from a bin, the flanges 363 and 365 are positioned just slightly below the flanges 305 and 307 of the bin so that the cassette will not catch an edge of the flanges 363 and 365 as it is being retracted into the carriage. The carriage is controlled to move back to home base where the cassette lifting arm is extended to bring the selected cassette into a position directly behind the door 23 (FIG. 1) so that the customer may remove the cassette through opening 21. The space immediately behind opening 21 may be occupied by a bin similar to that illustrated in FIG. 15 except that it would be configured to have the end adjacent the panel 11 completely open so that the cassette could be removed by the customer through opening 21.

In order to store a cassette which is returned to the machine by a customer, the carriage 332 is pre-positioned at the home base position with the arm 333 extended so that a customer may insert the returned cassette through opening 21 and rest it between the upward extensions 335 and 337. Motor 349 is then pulsed to retract the arm to a position between the side wall sections 359 and 361 of the carriage, after which the carriage is moved to a vertical position in which the flanges 363 and 365 of the carriage are just above the flanges 305 and 307 of the bins in the row of the preassigned bin in which the cassette is to be stored. The carriage is then moved horizontally to a position in which the upward projections 335 and 337 are aligned with the slots 309 and 329 of the preassigned bin after which the arm 333 is controlled by motor 349 to move horizontally into the bin, with the upward projection 337 pushing the cassette into the bin until it is in a position as shown in FIG. 14. Afterwards, the arm 333 is retracted slightly so that upward extension 337 clears the flared ends of side walls 301 and 303 and the carriage is moved back to the home base position in readiness for the next transaction.

FIG. 16 illustrates a modification of the components in FIGS. 14 and 15 whereby the cassette is stored on its broadside in a manner similar to that illustrated in FIGS. 11 to 13. For this purpose the storage bin 371 is configured with two elongated slots 373 and 375 for receiving respective arms 377 and 379 which together comprise the cassette lifting arm 180 in this embodiment. Arms 377 and 379 are provided with upward extensions 381 and 383, respectively, at their free ends for pulling the cassette out of bin 371 and upward extensions 384 and 385, respectively for pushing a cassette into the bin in a manner similar to that described in connection with FIGS. 14 and 15. Bin 371 is further constructed to present a channel 386 for the horizontal passage of extensions 381 and 383 for the same purpose discussed in connection with channel 331 shown in FIG. 14. Upward extensions 384 and 385 are connected to a bracket 387 which is connected via a ball nut 389 to a ball screw 391 and to a linear bearing 393 which slides along linear bearing rod 395 in the same manner as that described in connection with FIGS. 14 and 15. The embodiment of FIG. 16 operates in the same manner as the embodiment in FIGS. 14 and 15, the principal difference being that the cassette is lying on its side so that the horizontal rows of storage bins may be vertically spaced closer together.

For simplicity of illustration, FIG. 16 does not show a slotted platform such as that provided by flanges 363 and 365 which form the slot 367 in FIG. 15. However, in practice, a slotted platform having a shape corresponding to bin 371 would be mounted in operative relation to lifting arm 180 and would provide the same function as the platform formed by flanges 363 and 365 shown in FIGS. 14 and 15. The space 396 between upward extensions 384 and 385 would permit passage of the middle leg of the carriage platform (not shown).

Various modifications of the foregoing are possible within the principles of the invention. For example, in FIG. 4, instead of flaring the upper edges of the side walls 71 and 73 of bin 25 and the upper and lower edges of side wall sections 31a and 31b of carriage 30, each cassette may be enclosed by a suitably designed removable case 401 which has beveled edges 403 at its upper and lower ends as shown in FIG. 17. The beveled edges 403 of case 401 would then overcome the effects of a slight misalignment between a bin and the carriage in a manner equivalent to that provided by flaring the edges of the bin side walls and the carriage side wall sections when the cassette, enclosed in the case 401, is moved in the direction of the arrow 405 between the bin and the carriage side wall sections. A corresponding case with beveled edges could also be employed in the embodiment of FIG. 13 wherein the bins are configured for supporting a cassette on its broad side. In FIG. 13 the beveled edges would cooperate with upward projections 193-198 for centering the cassette case as it is lowered into a bin 173.

Similarly, in connection with the embodiment illustrated in FIGS. 14 and 15 in which the cassette is moved horizontally between bin and carriage, in lieu of flared edge portions 328a, 328b, 368a and 368b, each cassette may be provided with a case 407 with beveled edges 409 as shown in FIG. 18. Preferably all four edges of each vertical end of the case are beveled to provide for misalignments in the vertical as well as the horizontal direction when the case is moved horizontally in the direction of arrow 411 between bin and carriage. Obviously, the same case 407 could be used in the embodiment of FIG. 16, wherein the case would be supported on one of its broad sides, to compensate for misalignments between a bin and the carriage.

Figure 19:
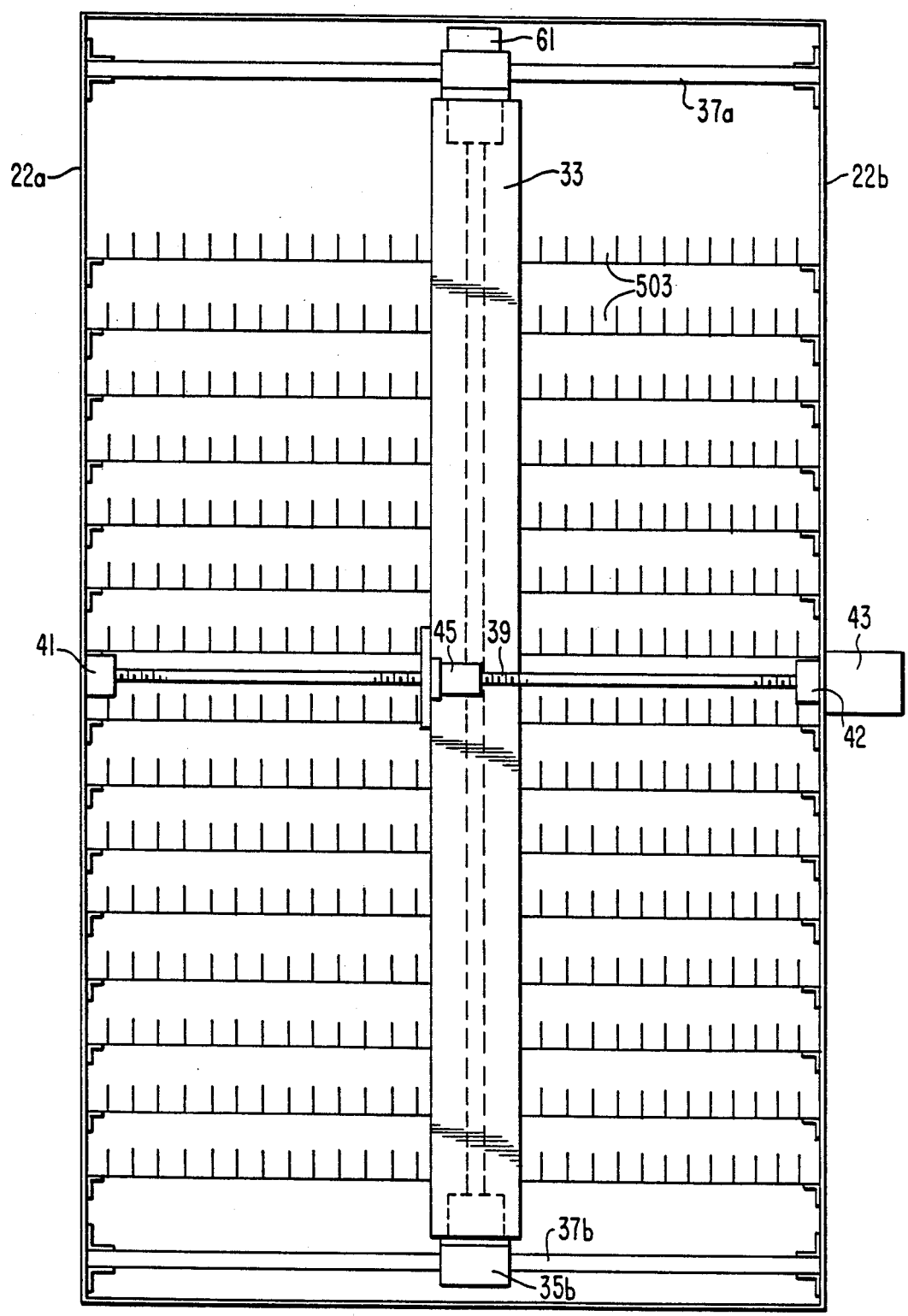
FIG. 19 is a schematic of a rear elevational view of the vending machine according to a further embodiment of the invention.
Figure 20:
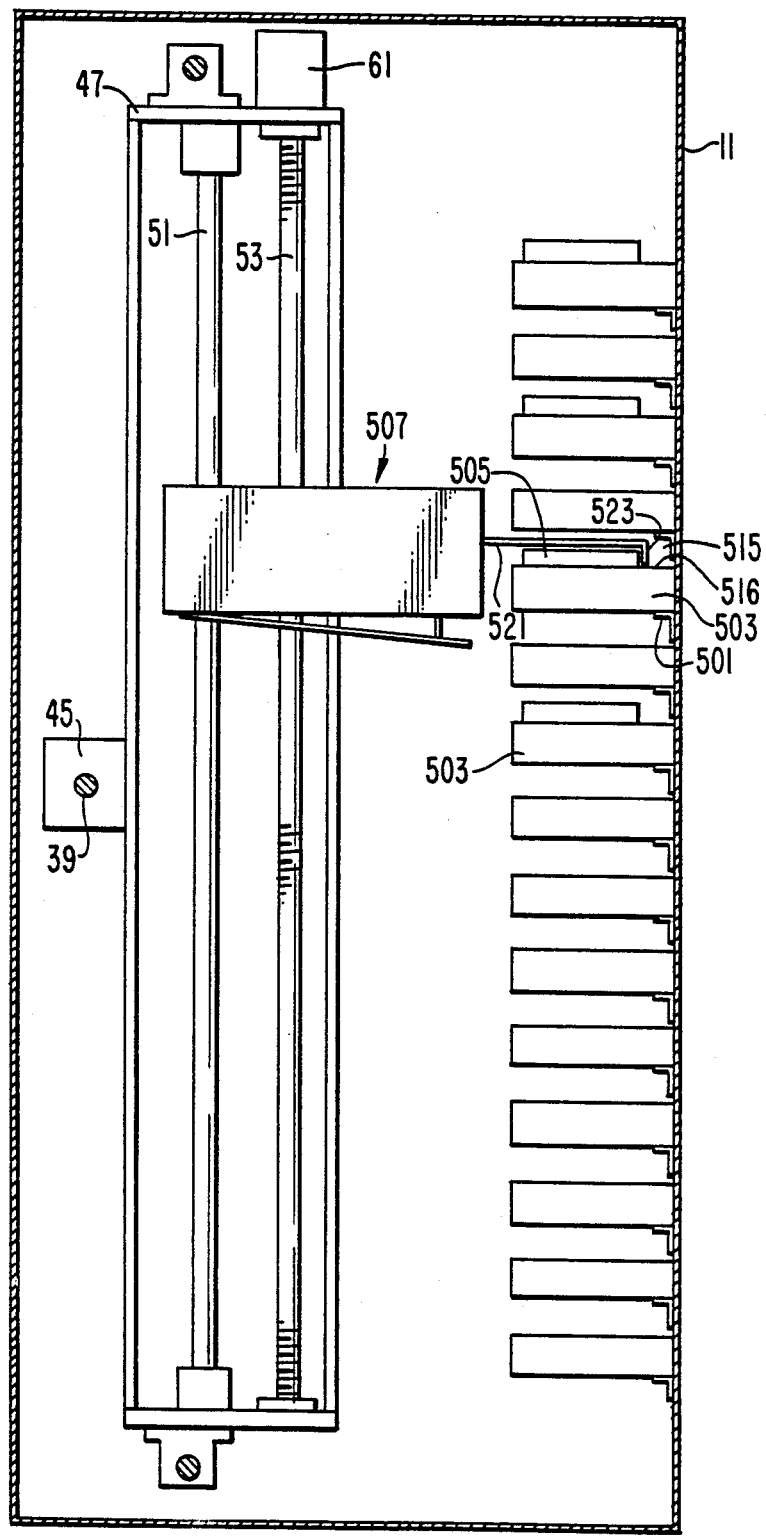
FIG. 20 is a schematic of a side elevational view in partial section of the machine in FIG. 19.

FIGS. 19-26 show another embodiment of the invention which has an overall configuration similar to the embodiment shown in FIGS. 1-3. FIGS. 19 and 20 are, respectively, rear and side elevational views wherein components corresponding to those in FIGS. 2 and 3 have been identified by the same numerals. The embodiment of FIGS. 19 and 20 is also similar to that of FIGS. 14 and 15 in that a cassette is inserted into and removed from a bin in the horizontal direction. As shown in FIGS. 19 and 20, a plurality of storage bins are connected to the front panel 11 of the machine in vertically stacked, horizontal rows so as to define horizontal passages above each row and a vertical passage communicating with each horizontal passage in a manner similar to the embodiment shown in FIGS. 2 and 3. The embodiment of FIGS. 19 and 20 differ from that of FIGS. 2 and 3 in the use of bin mounting brackets 501 for supporting cassette storage bins 503, and in the specific carriage assembly shown generally at 507.

Figure 21:
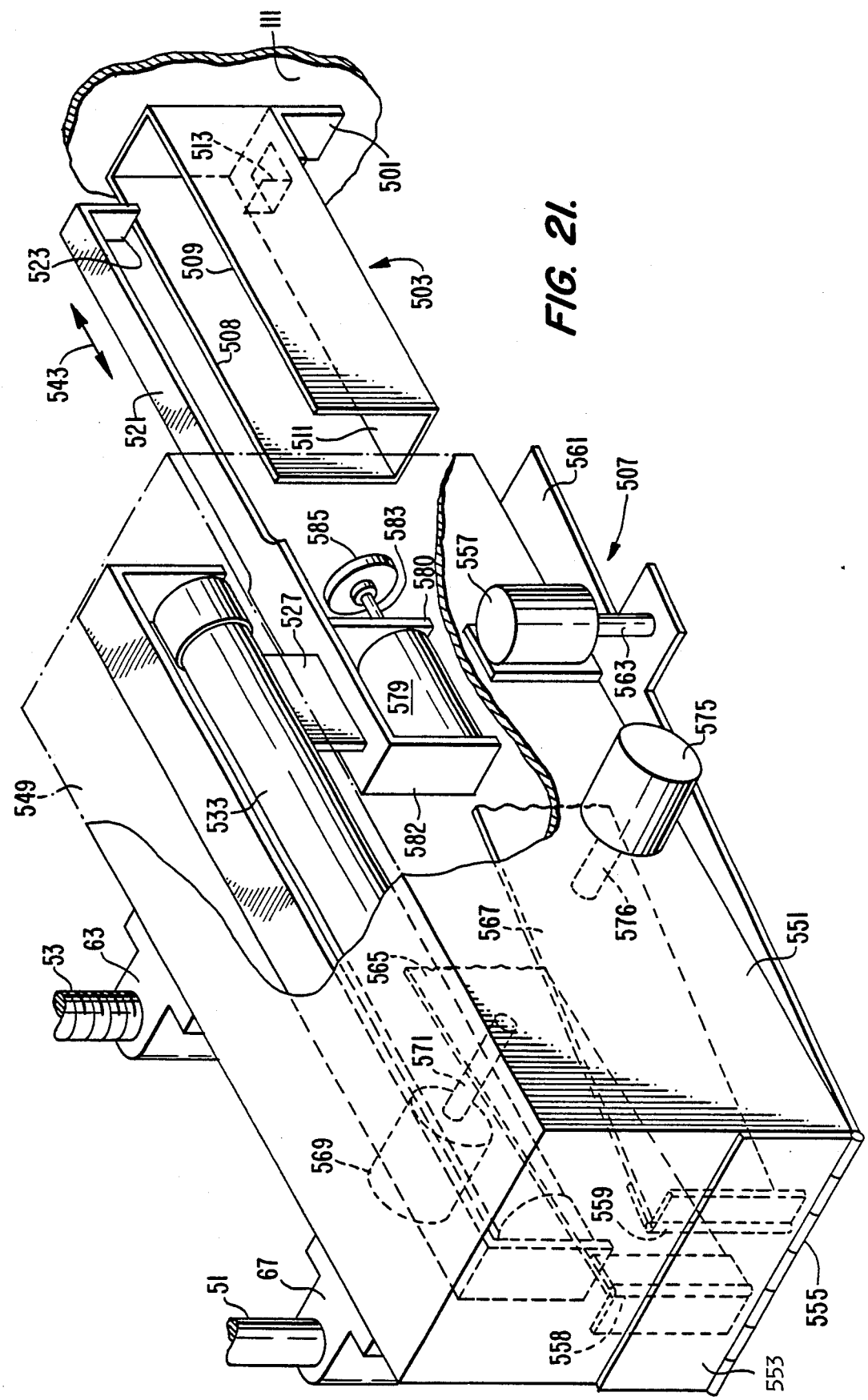
FIG. 21 is a perspective view of components shown in FIGS. 19 and 20.

FIG. 21 is a perspective view showing the carriage assembly 507 adjacent a storage bin 503. Bin 503 is provided with sidewalls 508 and 509 connected respectively to a bottom 511. Bottom 511 is attached to bin mounting bracket 501 or other fastening means for fixing the bin to front panel 11 of the vending machine.

Attached to bottom 511 is an angle bracket 513 which provides a stop beyond which a cassette 505 cannot be pushed. Preferably, side walls 508 and 509 are lower than the top of the cassette 505 stored therein when the cassette is resting on the bottom 511 of a bin 503. When the cassettes are in place in the bins, a horizontal channel 515 (see FIG. 20) is defined between each row of bins by the front panel 11, the adjacent ends of the cassettes and the top edges 516 of the bins. Horizontal channel 515 accomodates horizontal movement of a vertical extension of a cassette traversing arm as will be discussed below.

Carriage assembly 507 includes a pivotal bottom platform 561, two outer side walls 549 and 551 and an end section 553 to which are mounted hinges 555, 558 and 559. Outer side wall 549 is attached to ball nut 63 which is operatively engaged with vertically oriented ball screw 53 for effecting vertical movement of the carriage assembly under the control of stepper motor 61 and stepper motor controller 91 (FIG. 6). Side wall 549 is also attached to linear bearing 67 which is in slidingly engagement with linear bearing rod 51 as described in connection with FIG. 3.

In accordance with this aspect of the invention, carriage assembly 507 includes a cassette traversing arm 521 which is provided at one end with a downward extension (first vertical surface) 523. Near its other end, arm 521 is provided with an upward extension 527 which is connected to a piston (not shown) of a rodless pneumatic cylinder 533, such as an ORIGA rodless cylinder made by ORIGA Corporation of Elmhurst, Ill. Pneumatic cylinder 533 is connected to an electrically controllable source of pressurized air (not shown) for moving its piston and hence arm 521 in a horizontal direction, as indicated by the arrow 543 in FIG. 21.

One end of a platform 561 is pivotally attached to hinge 555. An electrically-operated hydraulic air cylinder 557 coupled to a supply of pressurized air is secured to sidewall 551. An actuator 563 of cylinder 557 is connected to platform 561 so that movement of actuator 563 swings the free end of platform 561 adjacent the bin in an arc about the axis of hinge 555.

In a similar manner, two inner side wall members 565 and 567 each have one end pivotably attached to respective hinges 558 and 559. Inner side wall member 565 is connected to an electrically-operated hydraulic air cylinder 569 having an actuator 571 which swings member 565 in an arc about the axis of hinge 558, and inner side wall member 567 is connected to an electrically-operated hydraulic air cylinder 575 having an actuator 576 which swings member 567 in an arc about the axis of hinge 559. Cylinders 569 and 575 are secured to the outer side walls 549 and 551, respectively, and are preferably connected by hoses (not shown) to the same supply of pressurized air which supplies cylinder 557 and pneumatic cylinder 533.

An electrically-operated air cylinder 579 is suitably attached for example by projections 580 and 582, beneath arm 521 at its end remote from downward extension 523. When compressed air is applied to cylinder 579 through an air hose (not shown), actuator 583 of cylinder 579 is translated to the right toward the bin storage area. At the front of actuator 583 is attached a flat member (second vertical surface) 585 which comes into contact with a cassette and pushes it toward the bin as the actuator is extended.

Figure 22:
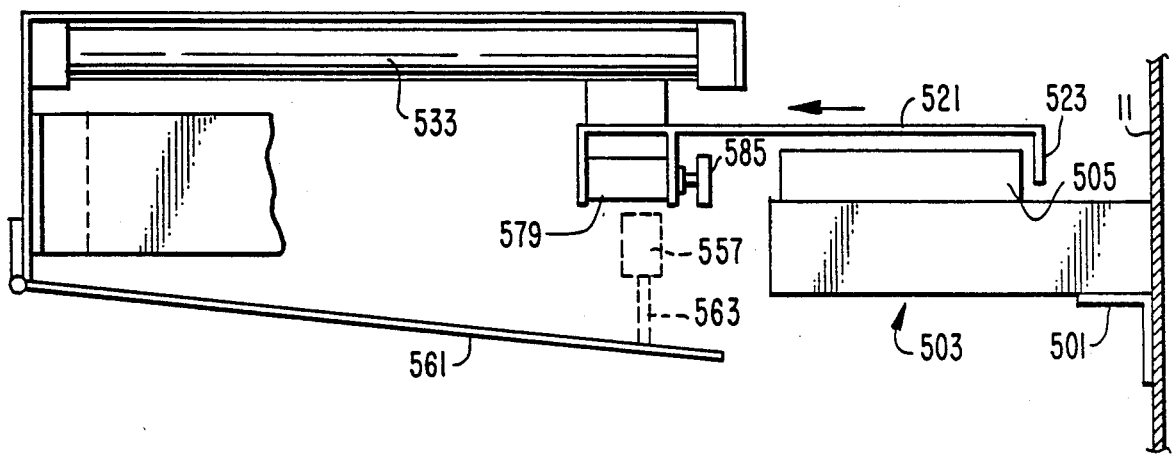
FIGS. 22 to 24 are side elevational views of components in FIG. 21 illustrating the manner of operation thereof.
Figure 23:
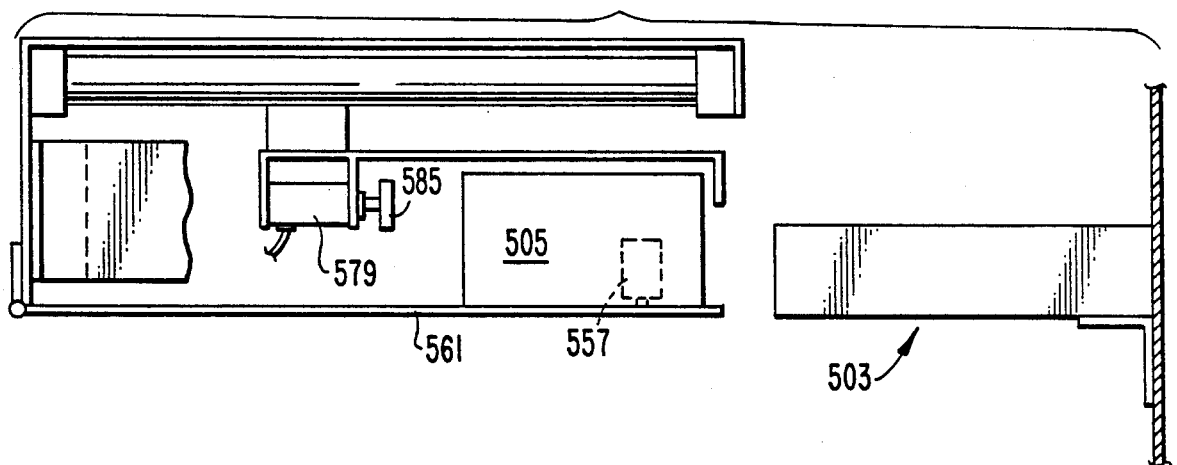
Figure 24:
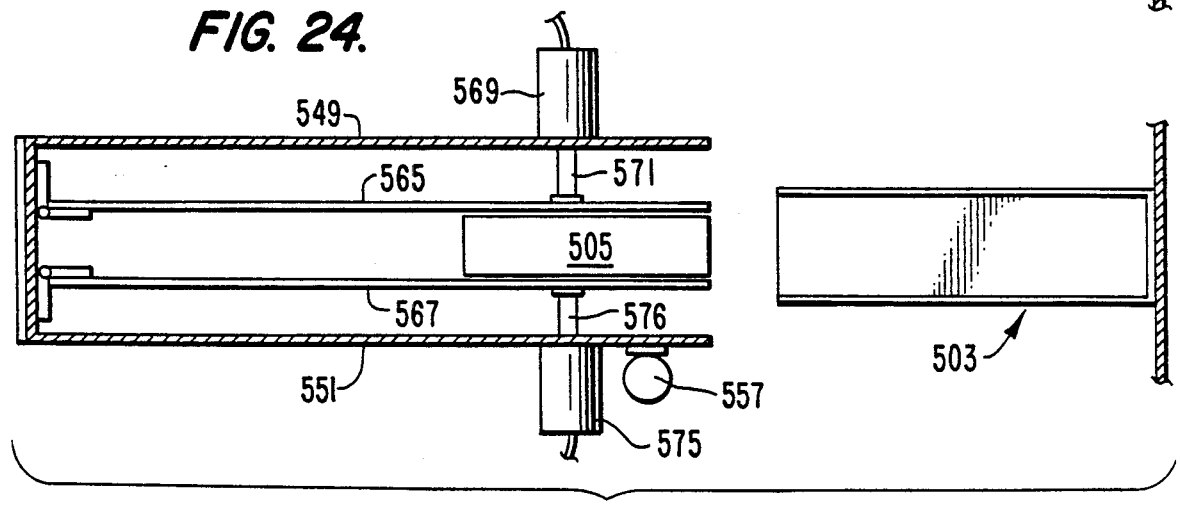

Referring now additionally to FIGS. 22 to 24, in order to remove a cassette from a selected storage bin, ball nut 63 is moved via ball screw 53 so that carriage assembly 507, with arm 521 fully extended, is moved vertically through the vertical passage in the array of bins until arm 521 is positioned above the row of bins in which the bin containing the selected cassette is stored. Then stepper motor 43 is activated for horizontally moving ball nut 45 and carriage assembly 507, with extension 523 moving through horizontal channel 515 until arm 521 is centered above the bin where the desired cassette is located. Arm 521 is then retracted so that extension 523 pulls the cassette horizontally, sliding it onto downwardly pivoted platform 561 (FIG. 22).

When the carriage is in position to receive a cassette, actuators 571 and 576 are retracted as shown in FIG. 21 so that the inner side wall members 565 and 567, respectively, are at their greatest distance apart, this width being greater than the space between side walls 508 and 509 of the bin where the cassette 505 is stored. As shown in FIG. 22, platform 561 is lowered by actuation of cylinder 557 below the level of the bottom 511 of the bin so that the cassette 505 drops slightly as it is pushed between the spread inner side wall members 565 and 567. This prevents the cassette from catching an edge of platform 561 when it is being retracted into the carriage assembly by traversing arm 521 as it is actuated by pneumatic cylinder 533. After, or near the end of the stroke which retracts arm 521, cylinders 557, 569 and 575 are actuated to bring platform 561 horizontal (FIG. 23) and to pivot inner side wall members 565 and 507 inwardly (FIG. 24) for laterally centering the cassette in the carriage assembly. After arm 521 is fully retracted, carriage assembly 507 is moved horizontally via ball nut 45 and ballscrew 39 and vertically via ball nut 63 and ball screw 53 to the home position adjacent door 23 of opening 21 (FIG. 1) in the front of the machine.

When carriage assembly 507 reaches the home position, traversing arm 521 is extended into a position directly behind the door 23 and platform 561 is in a raised position such that platform 561 is above a base plate at the home position (to be described hereinafter) so that the cassette will not catch on the edge of the base plate and so that the customer may remove the cassette through opening 21.

To return a cassette to its storage bin, carriage assembly 507 is initially located at the home position with platform 561 in its lowered position, i.e. with actuator 563 of cylinder 557 in it lowest position so that platform 561 is below the base plate at home position, and side wall members 565 and 567 spread apart. A cassette returned to the machine through opening 21 is retracted by arm 521 into carriage assembly 507 after which platform 561 is brought horizontal and side wall members 565 and 567 are brought parallel to laterally center the cassette in the carriage assembly in a manner similar to that described above when retrieving a cassette from a storage bin. The carriage is then moved horizontally and vertically so that it is in front of the desired storage bin with the platform 561 in the raised position so that it is above the level of the bottom 511 of the bin where the cassette is to be stored. Thus, when the cassette is moved from the carriage assembly to a bin, it will not catch on the edge of the bin bottom 511. Similarly, the cassette is centered in the carriage so that it will not come into contact with the edges of the side walls 508 and 509 of the bin. Cylinder 579 is activated to move the cassette closer to the designated storage bin. Arm 521 is controlled by pneumatic cylinder 533 to move horizontally into the bin with the member 585 pushing the cassette into the bin until the tail end of the cassette clears the front edges of the bin. Next, actuator 583 of cylinder 579 is retracted so that member 585 clears the ends of the bin. Arm 521 is then moved horizontally above the storage bins to the vertical passage, after which it is pulled back into the carriage assembly. Thereafter, the carriage is moved back to the home position so as to be ready for the next transaction.

Figure 25:
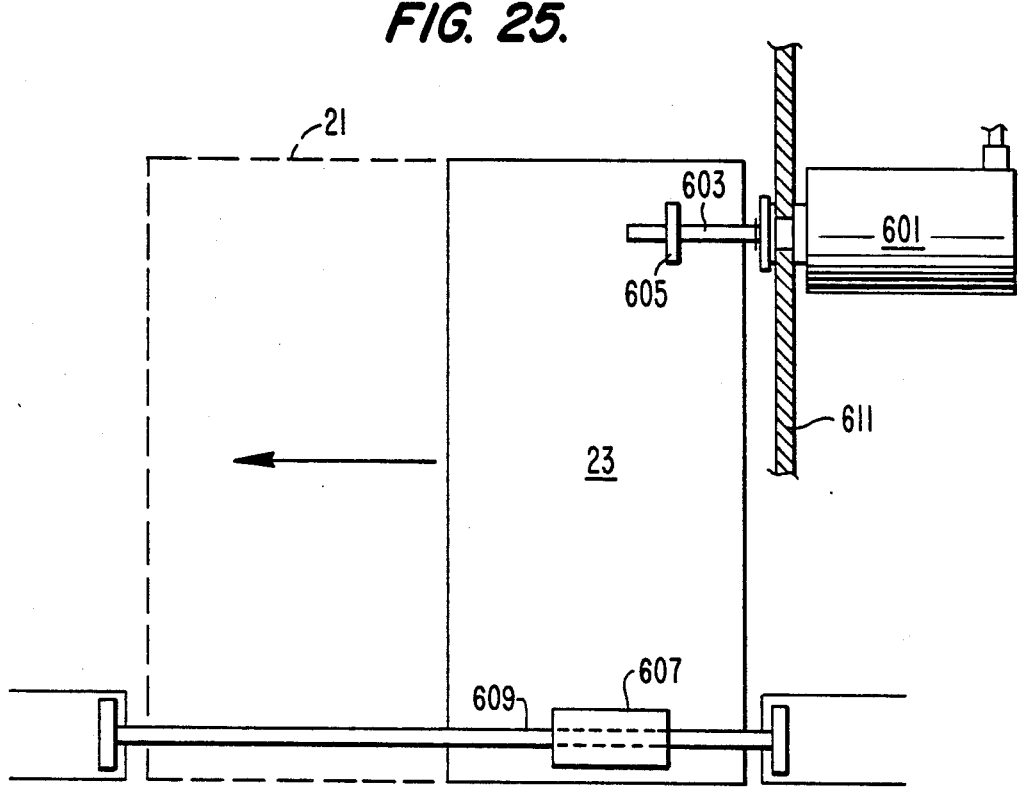
FIG. 25 is a schematic of a front elevational view of a door mechanism which can be used at the dispensing-return opening of the machine.

FIG. 25 shows a mechanism for controlling the door 23 covering opening 21 through which cassettes are removed from and returned to the machine. The open position of door 23 is shown in solid lines and the closed position in dashed lines. An air cylinder 601 having an actuator 603 is attached to the door by a bracket 605. The door is also attached to a linear bearing 607 which moves on a shaft 609.

Activation of air cylinder 601, which is attached to the vending machine frame 611, causes the actuator 603 to move horizontally, which causes the door 23 to move horizontally to the left to the dashed location. Linear bearing 607 provides support and guidance for the door.

When a cassette is returned, it must be moved to the end of the receiving platform so that door 23 will not be blocked by a partially inserted cassette. Also a bar code label (not shown) on the cassette must reach a location where it can be read by a bar code reader (not shown). At the same time the cassette must be in the proper location for the downward extension 523 of the arm 521 to make contact with the cassette in order to pull it out of home position into the carriage assembly.

When a customer indicates that a cassette is being returned, cylinder 601 causes the door 23 to move from the left-hand closed position shown in dashed lines to the right-hand open position shown in solid lines. This can be accomplished by a spring return on cylinder 601 or by employing a double-acting cylinder.

Figure 26:
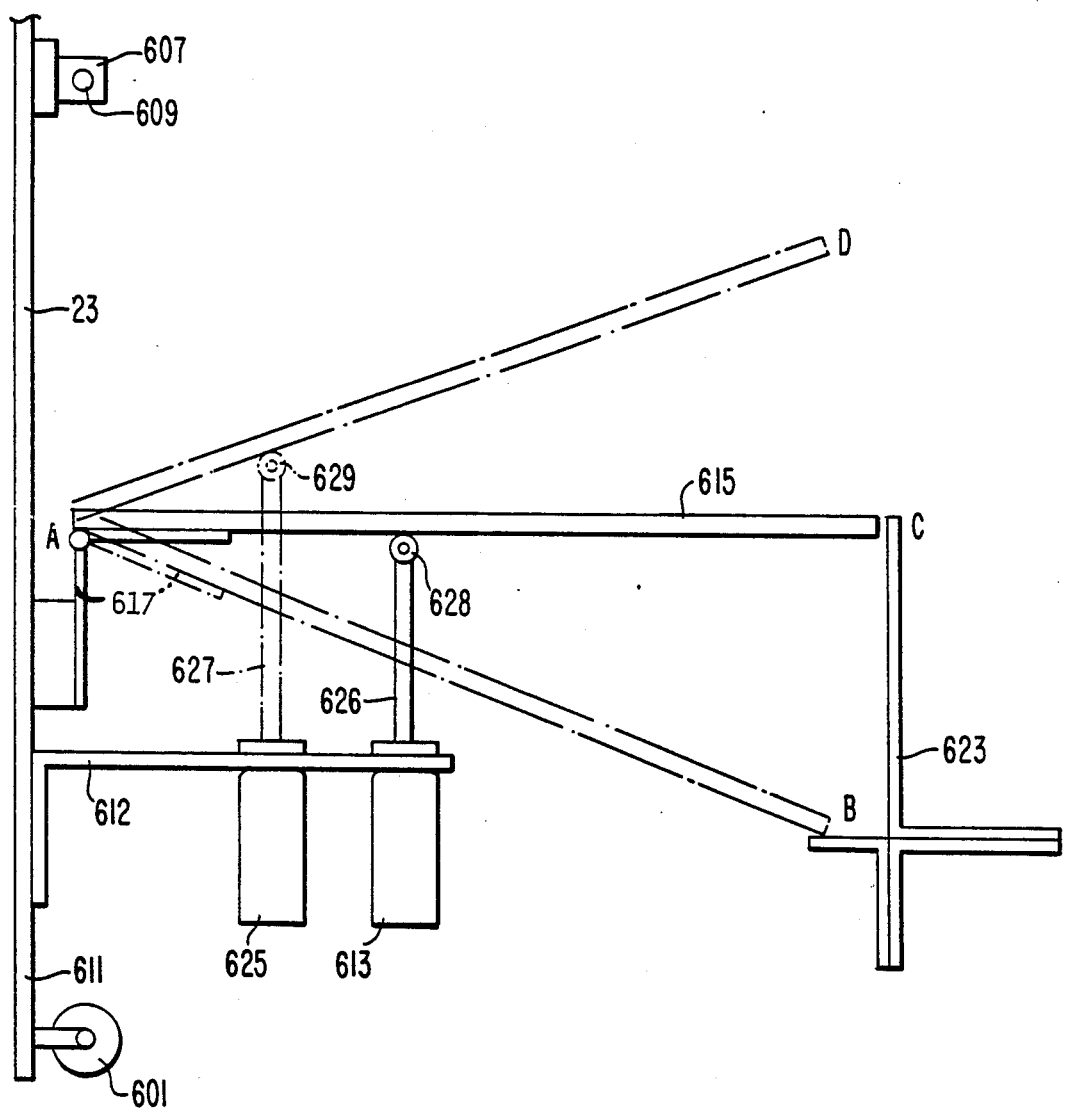
FIG. 26 is a schematic illustrating different positions of a pivotal base plate which can be used for transferring a container between the machine opening and a carriage mechanism in the embodiment of FIGS. 19 to 24.

FIG. 26 shows a pivotal base plate 615 connected to a hinge 617 at the home position according to a further aspect of the invention. Air cylinders 613 and 625 are attached to machine frame 611 via bracket 612 and have actuators 626 and 627, respectively. Each actuator has a free end provided with a roller 628, 629, for a low-frictional contact with base plate 615. When cylinder 613 is activated base plate 615 moves from position A-B to A-C. When cylinder 625 is activated, base plate 615 moves from position A-B to A-D. The locations of the cylinders and pivot points are such that gravity assists in moving base plate 615 to its horizontal position AC and its inclined position AB.

When the door 23 opens, both air cylinder 613 and 625 are fully retracted, placing base plate 615 in its tilted position A-B. Hinge 617 acts as a pivot point for base plate 615. Therefore a cassette placed on base plate 615 will slide forward until it reaches a stop 623 attached to the machine frame.

A bar code reader (not shown) reads a label which is located on the cassette. A photo-sensing switch (not shown) indicates that a cassette has been inserted by transmitting a signal to the computer through a programmable input of a motor controller (not shown) for controlling pressurized air to air cylinder 601. Thus, when a cassette is inserted, the computer sends a signal to close the door. After the door closes, the computer sends a signal for base plate 615 to return to its horizontal position A-C. After the bar code label is read, the computer sends the program for the storage of the cassette in a storage bin. If a returned cassette is inserted at the home position, but the bar code label is not read because of a defective label or no label, the computer will send instructions to store the cassette in a temporary storage bin. Also, if after the door has been opened the customer does not insert a cassette, the sensor will verify that the expected return did not take place. After a reasonable time delay, the computer sends a signal to close the door and return the base plate 615 to its horizontal position A-C.

When a cassette is delivered to the customer, arm 521 pushes the cassette onto base plate 615. After the bar code reader reads the label on the cassette, it is desirable to move the cassette close to the delivery door for ease of pickup by the customer. Cylinder 625 is then activated, causing base plate 615 to move to inclined position A-D. This causes the cassette to slide forward toward door 23. Base plate 615 is then returned to the level position A-C, and the computer signals door 23 to open. After the customer removes the cassette, a photo sensing switch (not shown) produces a signal reflecting the absence of the cassette, and this signal is sent to the computer. If, after a reasonable period of time this signal is not received, the computer will send the program for the cassette to be put back into its storage bin.

It will be understood that the above description of the present invention is susceptible to various other modifications, changes and adaptations, and the same are intended to be comprehended within the meaning and range of equivalents of the appended claims.

What is claimed is:

1. A machine for automatically dispensing a selected container from a store of containers and for automatically storing a container returned to the machine, said machine comprising:
    (a) an array of storage bins for storing a plurality of containers, said bins being arranged in a plurality of vertically-stacked, horizontal rows, with a horizontal passage between adjacent ones of said horizontal rows and a vertical passage connecting the horizontal passages, each bin having a bottom for supporting a container, and each container being stored in a respective one of said bins;
    (b) carriage means mounted for movement relative to said bins for transporting a container between a first machine position for dispensing a selected container and for receiving a returned container, and a second machine position corresponding to one of said bins, said carriage means including a bottom platform with a free end adjacent said array and an opposite end pivotally attached to said carriage means for pivoting about a horizontal axis so that the height of said free end can be selectively adjusted to be above or below the bottom of said one bin depending on whether a container is being inserted into or withdrawn from said one bin, respectively;
    (c) a controllable arm mounted to said carriage means for movement therewith between said first and second machine positions and for movement relative to said carriage means along a horizontal path transverse to said horizontal passages, said controllable arm presenting first and second vertical surfaces; and
    (d) control means responsive to an input signal which corresponds to one of said bins for moving said carriage means between said first and second machine positions and for moving said controllable arm along said horizontal path at said second machine position for one of removing a selected container from, or inserting a returned container into said one bin, the first vertical surface of said controllable arm being disposed for pushing a selected container out of its associated bin and into said carriage means when said controllable arm is controlled to move in one direction along said horizontal path, and the second vertical surface of said controllable arm being disposed for pushing a returned container from said carriage means into said one bin when said controllable arm is controlled to move in the opposite direction along said horizontal path.

2. Machine according to claim 1, and further including actuating means connected to said platform near said free end for controllably pivoting said free end about said opposite end.

3. Machine according to claim 1, wherein said horizontal rows of bins are spaced apart in the vertical direction so that when the cassettes are in said bins there is sufficient space between the tops of the cassettes in one row and the bottoms of the bins in the horizontal row immediately thereabove to define a horizontal passage which has a height smaller than the height of the first vertical surface of said controllable arm, and further including means defining a horizontal channel between said rows of bins at the end of said bins remote from said carriage which has sufficient height to accommodate horizontal movement of said first vertical surface.

4. Machine according to claim 1, wherein said carriage means further comprises lateral adjustment means for laterally adjusting the position of a container within said carriage means to a predetermined lateral position.

5. Machine according to claim 4, wherein said lateral adjustment means includes two side walls, at least one of which is displaceable relative to the other.

6. Machine according to claim 4, wherein said lateral adjustment means includes two controllably movable side walls which can be controlled to adjust the width of the space between said side walls.

7. Machine according to claim 6, wherein said two side walls each have one end remote from said bins and a free end adjacent said bins which is pivotable about said one end for adjusting a spread between said two walls at their free ends.

8. Machine according to claim 7, wherein said lateral adjustment means includes actuating means connected to each side wall near its said free end for controllably pivoting such side wall about said one end.

9. A machine for automatically dispensing a selected container from a store of containers and for automatically storing a container returned to the machine, said machine comprising:
(a) an array of storage bins for storing a plurality of containers, said bins being arranged in a plurality of vertically-stacked, horizontal rows, with a horizontal passage between adjacent ones of said horizontal rows and a vertical passage connecting the horizontal passages, and each container being stored in a respective one of said bins;
(b) carriage means mounted for movement relative to said bins for transporting a container between first machine position for dispensing a selected container and for receiving a returned container, and a second machine position corresponding to one of said bins;
(c) a controllable arm mounted to said carriage means for movement therewith between said first and second machine positions and for movement relative to said carriage means along a horizontal path transverse to said horizontal passages, said controllable arm presenting first and second vertical surfaces;
(d) control means responsive to an input signal which corresponds to one of said bins for moving said carriage means between said first and second machine positions and for moving said controllable arm along said horizontal path at said second machine position for one of removing a selected container from, or inserting a returned container into said one bin, the first vertical surface of said controllable arm being disposed for pushing a selected container out of its associated bin and into said carriage means when said controllable arm is controlled to move in one direction along said horizontal path, and the second vertical surface of said controllable arm being disposed for pushing a returned container from said carriage means into said one bin when said controllable arm is controlled to move in the opposite direction along said horizontal path, said control means including a first piston means connected to said controllable arm for moving said controllable arm back and forth along said horizontal path and a second piston means connected to said second vertical surface for moving said second vertical surface relative to said controllable arm along said horizontal path, wherein when a cassette is pushed from said carriage means into a said one bin, the cassette moves a distance along said horizontal path which corresponds to the combined strokes of said first and second piston means in the direction towards said one bin.

10. A machine for automatically dispensing a selected container from a store of containers and for automatically storing a container returned to the machine, said machine comprising:
(a) an array of storage bins for storing a plurality of containers, said bins being arranged in a plurality of vertically-stacked, horizontal rows, with a horizontal passage between adjacent ones of said horizontal rows and a vertical passage connecting the horizontal passages, and each container being stored in a respective one of said bins;
(b) carriage means mounted for movement relative to said bins for transporting a container between a first machine position for dispensing a selected container and for receiving a returned container, and a second machine position corresponding to one of said bins;
(c) a controllable arm mounted to said carriage means for movement therewith between said first and second machine positions and for movement relative to said carriage means along a horizontal path transverse to said horizontal passages, said controllable arm presenting first and second vertical surfaces;
(d) control means responsive to an input signal which corresponds to one of said bins for moving said carriage means between said first and second machine positions and for moving said controllable arm along said horizontal path at said second machine position for one of removing a selected container from, or inserting a returned container into said one bin, the first vertical surface of said controllable arm being disposed for pushing a selected container out of its associated bin and into said carriage means when said controllable arm is controlled to move in one direction along said horizontal path, and the second vertical surface of said controllable arm being disposed for pushing a returned container from said carriage means into said one bin when said controllable arm is controlled to move in the opposite direction along said horizontal path, said control means including pivoting means;

(e) a machine frame having an opening at said first machine position through which a cassette can pass; and (f) a base plate disposed at said first machine position for supporting a cassette received through said opening or from said carriage means, said base plate having one end remote from said carriage means and pivotally connected to said machine frame and a free end adjacent to said carriage means which is pivotable about said one end, said pivoting means selectively pivoting said base plate in a first position downwardly inclined toward said opening, a second position which is horizontal, and a third position which is upwardly inclined toward said opening.

11. Machine according to claim 10, and further comprising an abutment fixed to said machine frame to serve as a stop for a cassette supported on said base plate when said base plate when is in said third position.

12. A machine for automatically dispensing a selected container from a store of containers and for automatically storing a container returned to the machine, said machine comprising:

(a) an array of storage bins for storing a plurality of containers, said bins being arranged in a plurality of vertically-stacked, horizontal rows, with a horizontal passage between adjacent ones of said horizontal rows and a vertical passage connecting the horizontal passages, and each container being stored in a respective one of said bins;

(b) carriage means mounted for movement relative to said bins for transporting a container between a first machine position for dispensing a selected container and for receiving a returned container, and a second machine position corresponding to one of said bins;

(c) a controllable arm mounted to said carriage means for movement therewith between said first and second machine positions and for movement relative to said carriage means along a horizontal path transverse to said horizontal passages, said controllable arm presenting first and second vertical surfaces;

(d) control means responsive to an input signal which corresponds to one of said bins for moving said carriage means between said first and second machine positions and for moving said controllable arm along said horizontal path at said second machine position for one of removing a selected container from, or inserting a returned container into said one bin, the first vertical surface of said controllable arm being disposed for pushing a selected container out of its associated bin and into said carriage means when said controllable arm is controlled to move in one direction along said horizontal path, and the second vertical surface of said controllable arm being disposed for pushing a returned container from said carriage means into said one bin when said controllable arm is controlled to move in the opposite direction along said horizontal path, said control means including pivoting means;

(e) a machine frame having an opening at said first machine position through which a cassette can pass; and (f) a base plate disposed at said first machine position for supporting a cassette received through said opening or from said carriage means, said base plate having one end remote from said carriage means and pivotally connected to said machine frame and a free end adjacent to said carriage means which is pivotable about said one end, said pivoting means selectively pivoting said base plate between a horizontal position and a position inclined toward said opening.

* * * * *